April 15, 1941. A. AMES, JR., ET AL 2,238,207
TESTING EYES
Filed Nov. 6, 1937  11 Sheets-Sheet 4
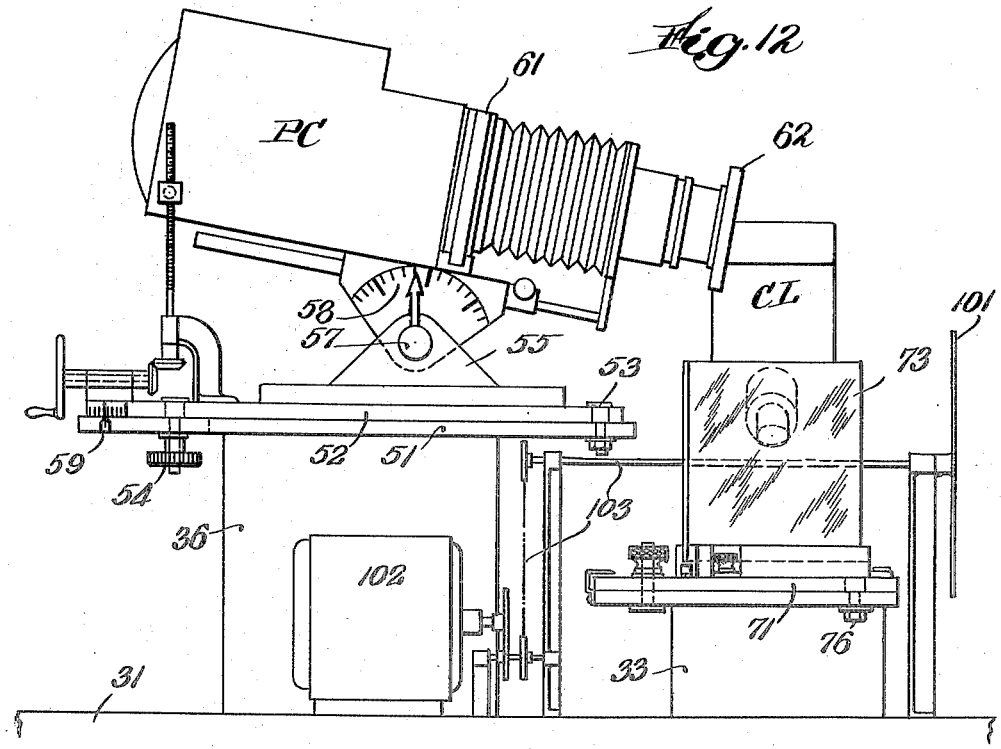
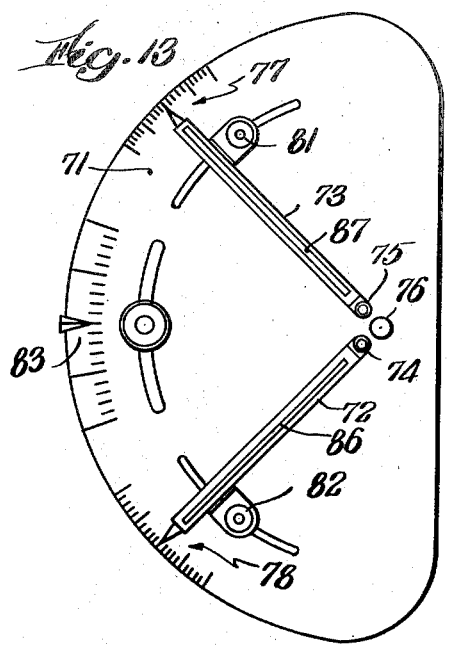
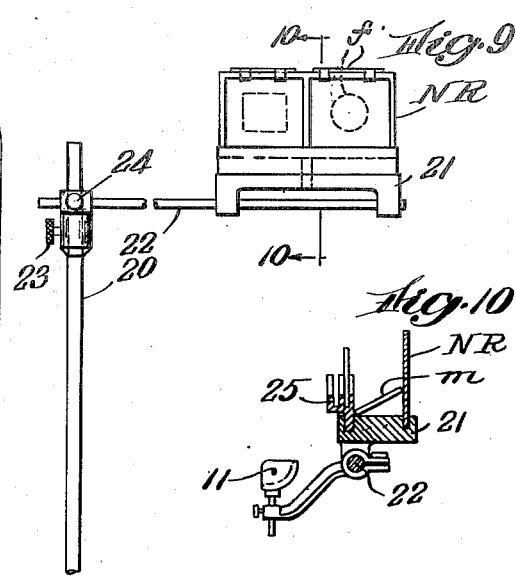

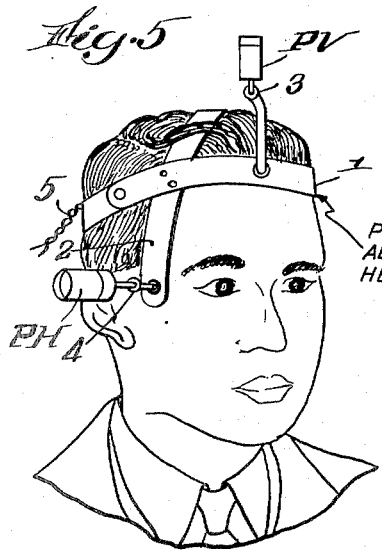
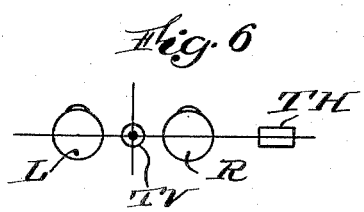
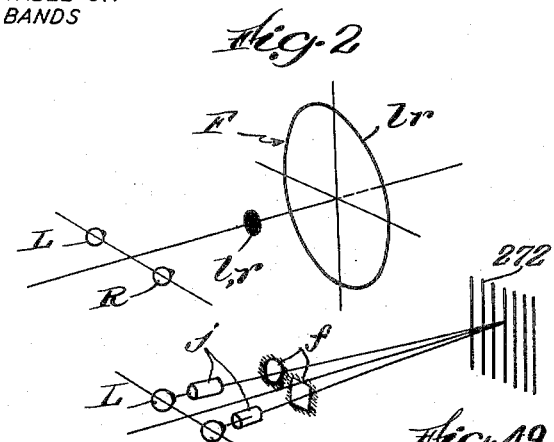
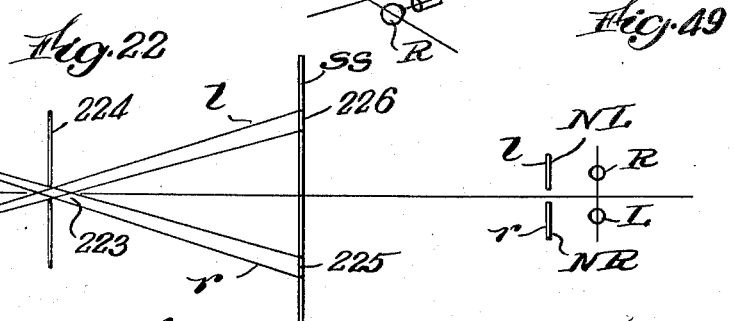
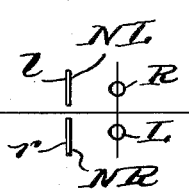
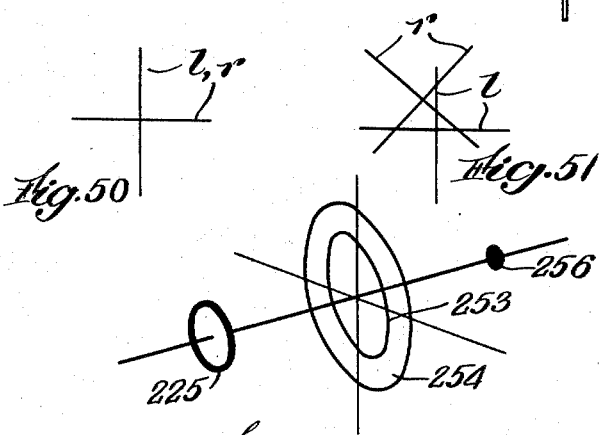
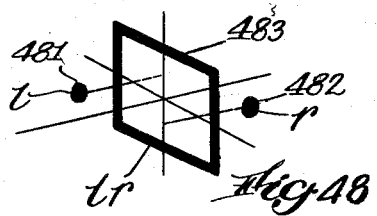

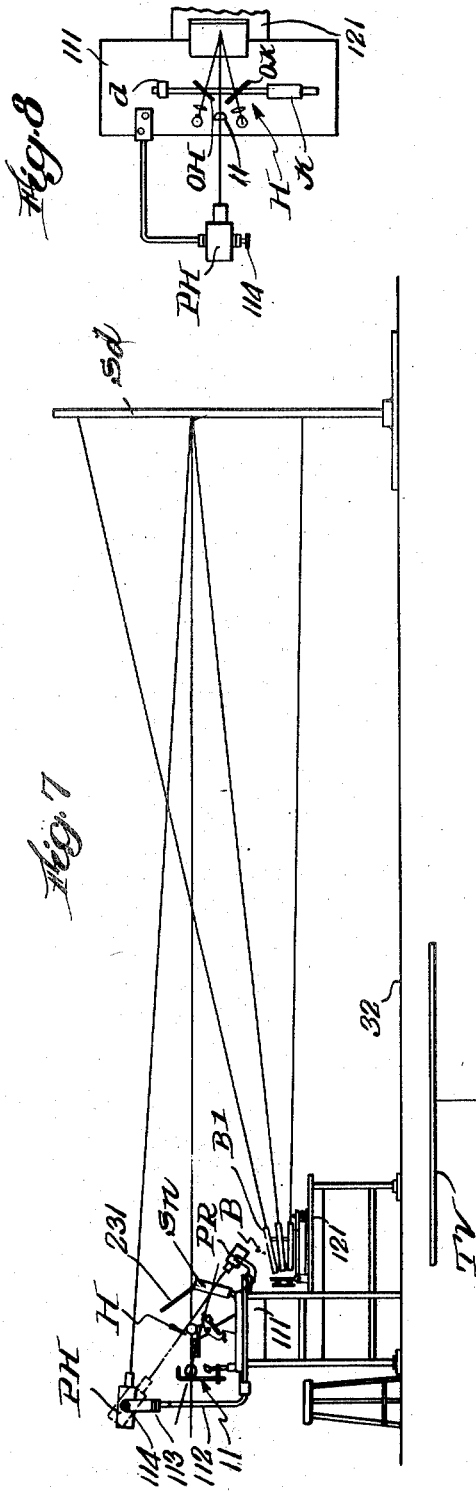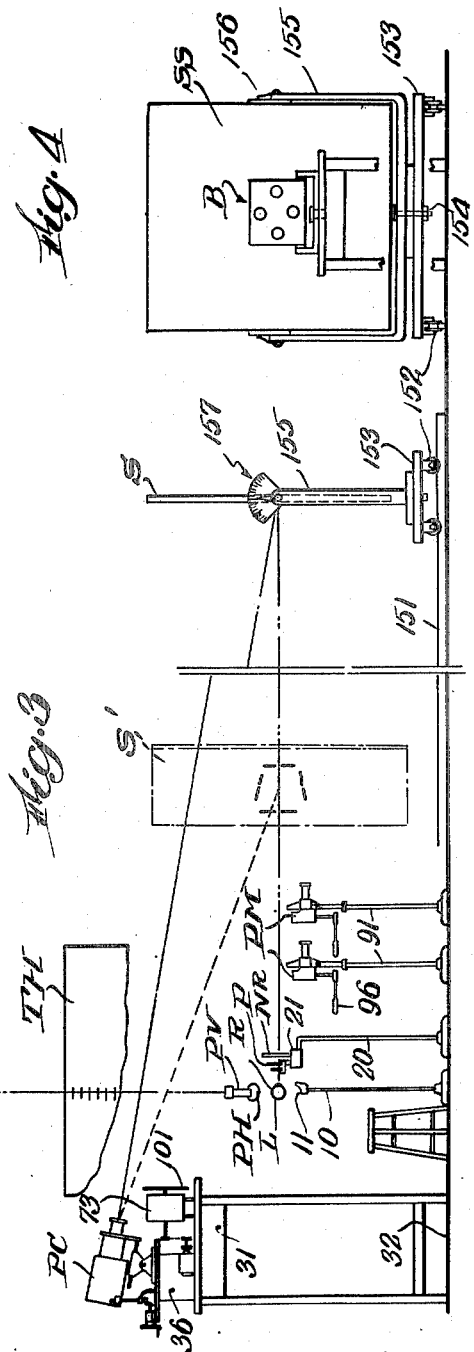

April 15, 1941.　　A. AMES, JR., ET AL　　2,238,207
TESTING EYES
Filed Nov. 6, 1937　　11 Sheets-Sheet 5
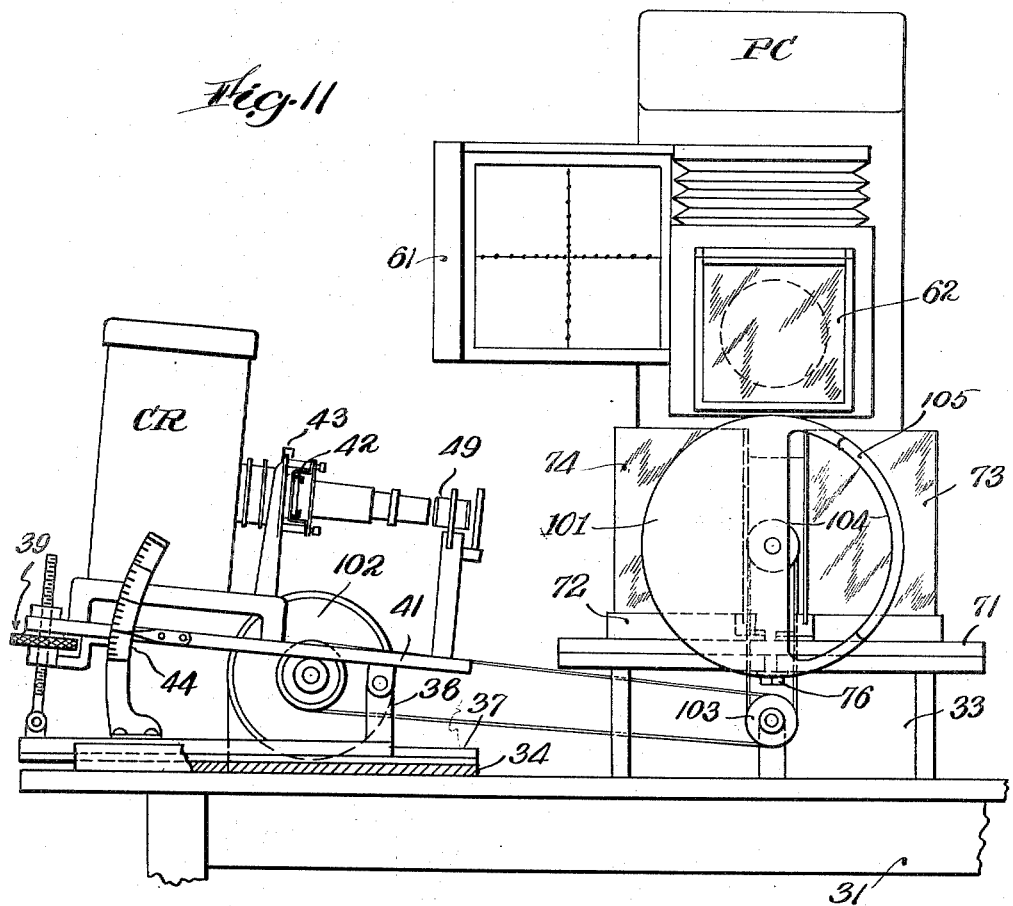
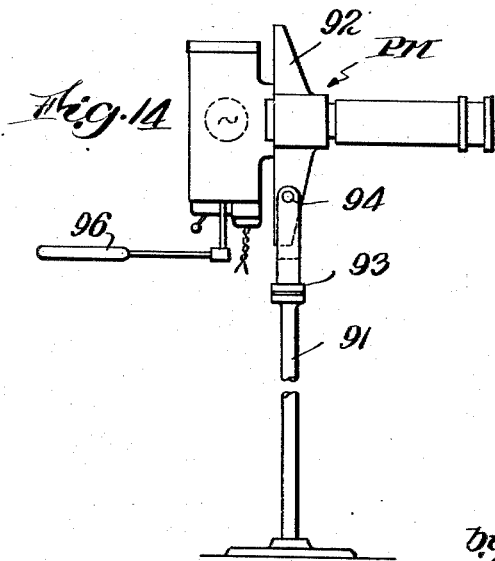
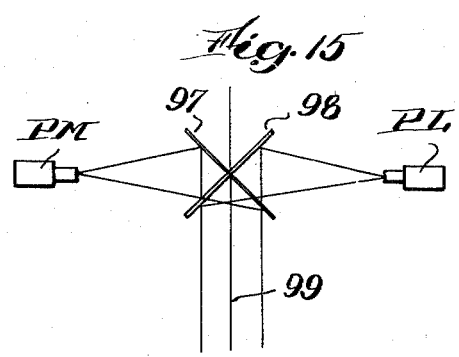
Inventors
Adelbert Ames, Jr.
Henry A. Truss
by Roberts, Cushman & Woodbury Attys.

April 15, 1941.  A. AMES, JR., ET AL  2,238,207
TESTING EYES
Filed Nov. 6, 1937  11 Sheets-Sheet 6
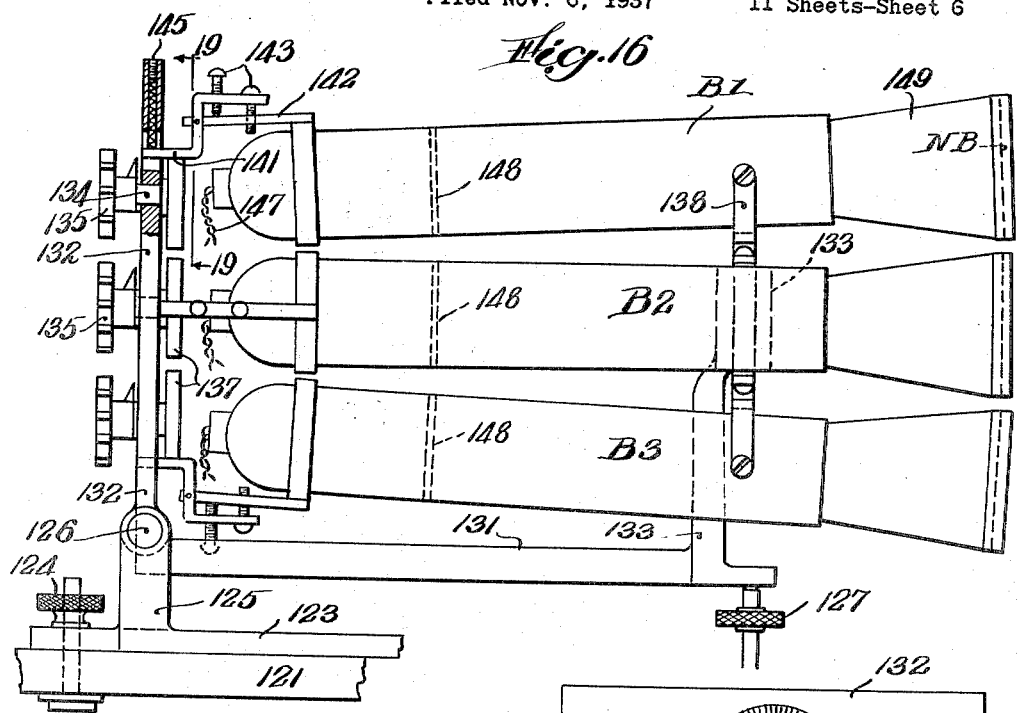
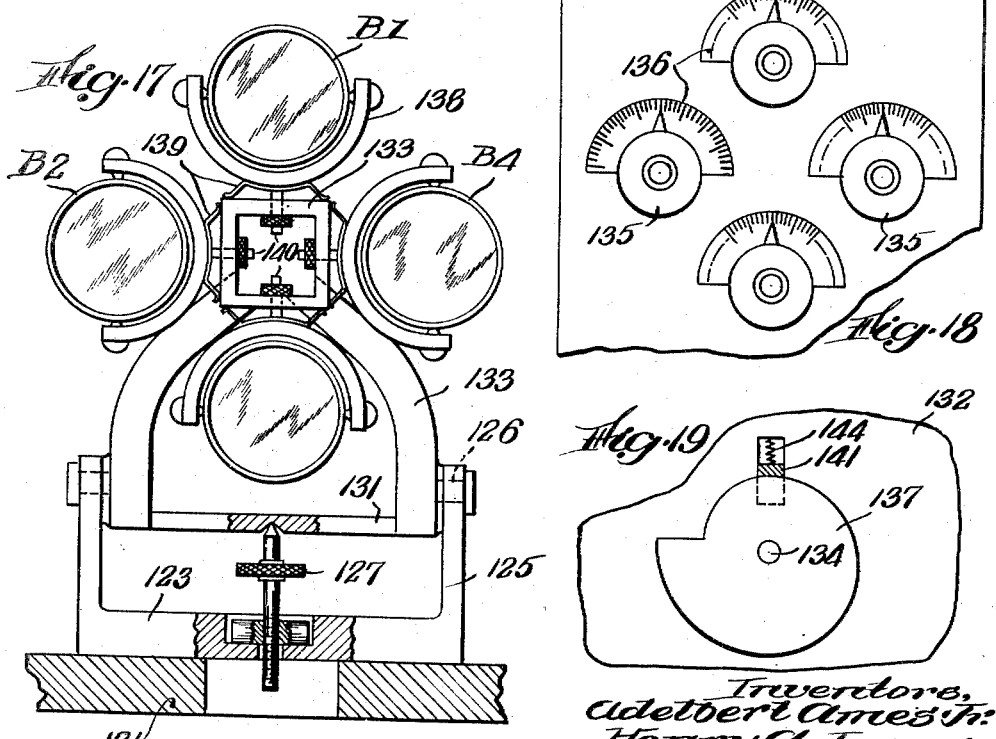
Inventors,
Adelbert Ames Jr.
Henry A. Imus April 15, 1941.  A. AMES, JR., ET AL  2,238,207
TESTING EYES
Filed Nov. 6, 1937  11 Sheets-Sheet 7

Inventors
Adelbert Ames, Jr.
Henry A. Imus
by Roberts, Cushman & Woodberry
Attys.

April 15, 1941.   A. AMES, JR., ET AL   2,238,207
TESTING EYES
Filed Nov. 6, 1937   11 Sheets-Sheet 8
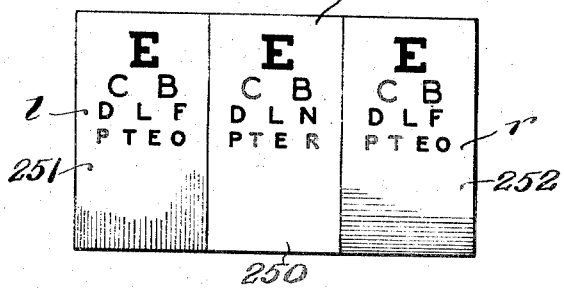
Fig. 23
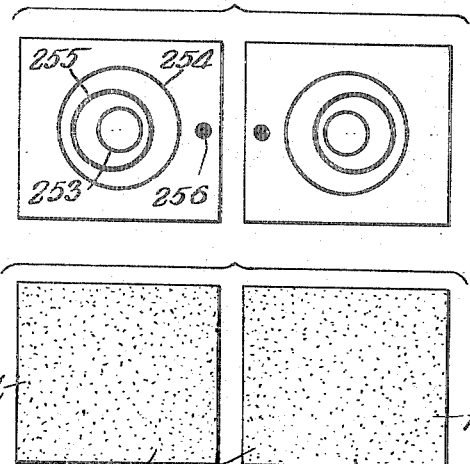
Fig. 24
Fig. 26
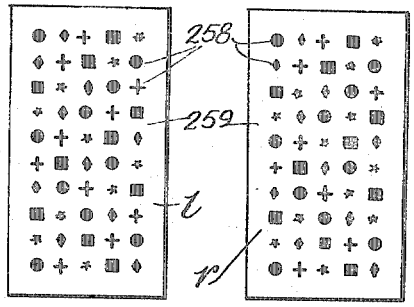
Fig. 25
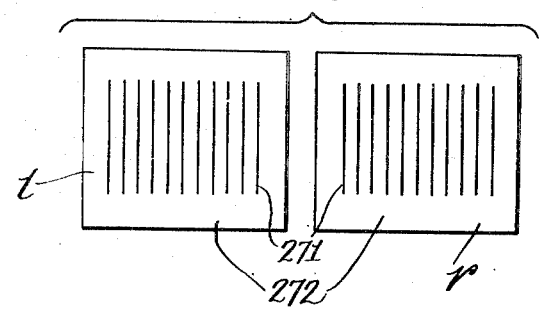
Fig. 27
Inventors
Adelbert Ames, Jr.
Henry A. Ames
by Roberts, Cushman & Woodberry
Attys.

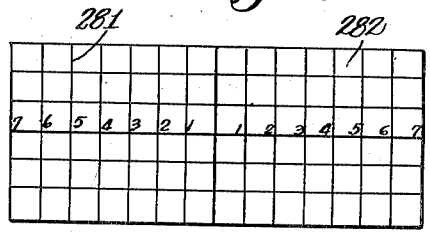
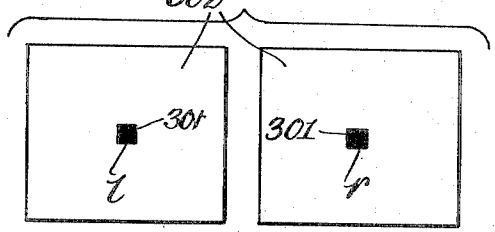
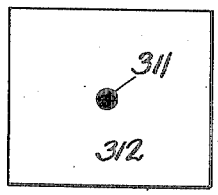
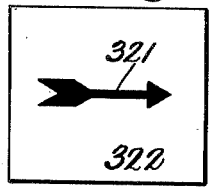
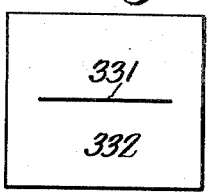
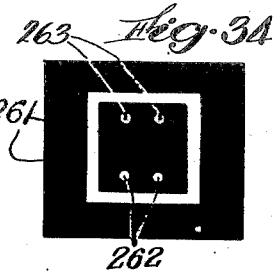
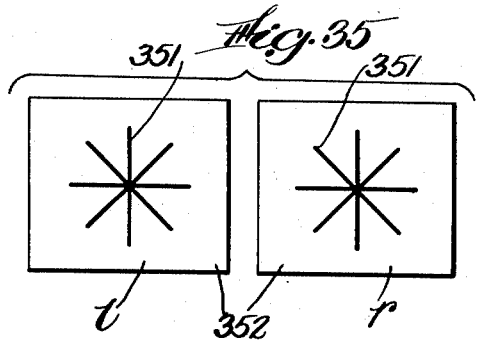

April 15, 1941.  A. AMES, JR., ET AL  2,238,207
TESTING EYES
Filed Nov. 6, 1937   11 Sheets-Sheet 10
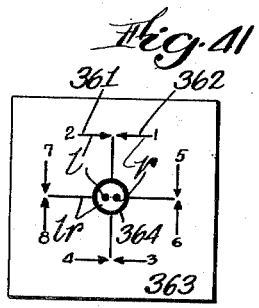
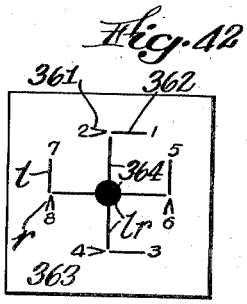
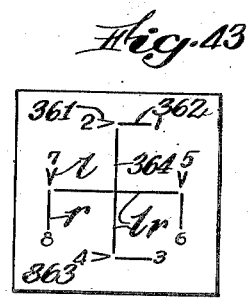
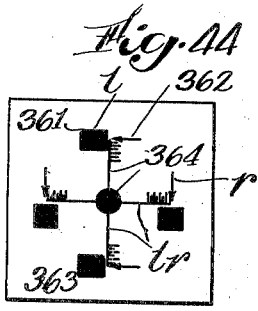
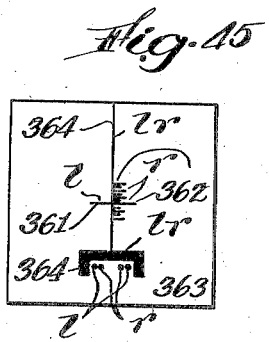
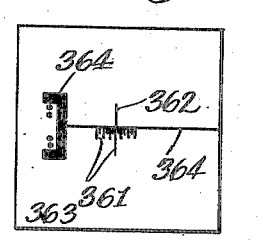

April 15, 1941.                A. AMES, JR., ET AL                2,238,207
                                  TESTING EYES
                              Filed Nov. 6, 1937        11 Sheets-Sheet 11

Fig. 55

| EXAMINER | SYMMETRIC | ASYMMETRIC |
| --- | --- | --- |
| | ANISEIKONIC | |
| A | | |
| B | | |
| C | | |
| D | | |
| E | | |
| F | | |
| G | | |

Fig. 54

| EXAMINER | ISEIKONIC PATIENT |
| --- | --- |
| A | |
| B | |
| C | |

Patented Apr. 15, 1941

2,238,207

UNITED STATES PATENT OFFICE 2,238,207

TESTING EYES

Adelbert Ames, Jr., and Henry A. Imus, Hanover, N. H., assignors to Trustees of Dartmouth College, Hanover, N. H., a corporation of New Hampshire Application November 6, 1937, Serial No. 173,110

32 Claims. (Cl. 88—20)

This invention deals with the testing of eyes and is particularly concerned with a method of examining binocular vision for all types of defects in a manner representing improvements as to simplicity, accuracy, versatility and adaptability, and with apparatus for carrying out this method.

Previous arrangements for example as described in Patent No. 2,095,235, of October 12, 1937, while sufficiently accurate and adaptable for most purposes, involve mechanical structures whose operation can not be easily supervised and controlled during operation; also, such instruments are rather expensive and not as universally adaptable to all kinds of ocular investigations and examinations as might be desired.

It is one of the principal objects of the present invention to provide an ocular test with the aid of test patterns optically projected in such a manner that they can be in a simple manner differentiated as to visibility to the respective eyes of a patient, and easily and accurately adjusted as to their spatial position regarding the patient, and the mutual position of test pattern components.

In one aspect, our invention provides test objects which can be simply and yet accurately changed, adjusted and regulated during the test by the patient as well as by the examiner, the latter being able constantly to supervise, to adjust, to modify and to relocate test objects observed or adjusted by the patient. In another aspect, the invention provides for the testing of all phenomena of binocular and monocular vision as refraction (including astigmatism), muscular conditions (phorias, tropias) aniseikonia (symmetric or asymmetric) and fusional response (foveal and peripheral), with or without maintaining binocular fixation by using test patterns projected with light differentiated for observation by the respective eyes, preferably by means of polarized light.

Further objects of the invention are improved tests for dioptric defects during binocular vision, of muscular defects, and especially of aniseikonia, which is defined as an anomaly of the binocular visual apparatus in which a difference or incongruity exists between the size or shape of the ocular images of the two eyes. The term "ocular image" describes the final impression received in the higher brain centers through the vision of one eye. The effective magnitude and shape of this impression are determined not only by the properties of the dioptric image as formed on the retina, but also by the modifications imposed upon that image by the anatomical properties and physiological processes by which the optical image upon the retina becomes evident in the higher cortical centers.

Concerning defects of the last mentioned type, namely aniseikonia, the invention provides for the first time the possibility of comparing size and shape of ocular images either by maintaining or continuously changing the direction of the lines of vision of any one, or both eyes, and for investigating elementary portions of the visual field for ocular image discrepancies. For that purpose, our invention permits the presentation to a pair of eyes of a test pattern only visible to one of the two eyes, of similar test patterns visible to both eyes, of similar patterns each only visible to one of the two eyes, and of dissimilar patterns each only visible to one of the two eyes; these patterns can be shifted at will over the entire field of vision and their relative position, size and shape adjusted in convenient and yet inherently accurate manner.

Still another aspect of our invention is an arrangement for locating in space the head of a patient without mechanically restraining it, providing the possibility of determining the relative positions of testing apparatus, head, and eyes.

These and other objects, aspects and features of our invention will be apparent from the following detailed description illustrating the genus of the invention with reference to several concrete embodiments thereof. The description refers to drawings, in which:

Fig. 2 is a diagram indicating the appearance of the fusion object shown in Fig. 1;

Fig. 3 is a side elevation of one practical embodiment of the eye testing equipment diagrammatically shown in Fig. 1;

Fig. 4 is a rear elevation of the equipment shown in Fig. 3;

Fig. 5 is an isometric detail of the head projector equipment diagrammatically shown in Fig. 1;

Fig. 6 is a top view of the projectors shown in Fig. 5;

Fig. 7 is a side elevation of another practical embodiment of the equipment shown in Fig. 1;

Fig. 8 is a top view of the equipment shown in Fig. 7;

Fig. 9 is a front view of the optical stand diagrammatically shown in Fig. 1;

Fig. 10 is a section on line 10—10 of Fig. 9;

Fig. 11 is a front elevation of the projector arrangement as shown in Fig. 3, with one side projector omitted;

Fig. 12 is a side elevation corresponding to Fig. 11;

Fig. 13 is a top view detail of the mirror support shown in Figs. 11 and 12;

Fig. 14 is a side elevation of the hand projector indicated in Fig. 1;

Fig. 15 is a diagram of an interlaced mirror arrangement;

Fig. 16 is a side elevation of the projector battery indicated in Fig. 1;

Fig. 17 is a front elevation of the battery;

Fig. 18 is a detail of the battery dial board;

Fig. 19 is a detail of the battery adjustment device;

Fig. 22 is a diagram illustrating a continuously adjustable depth fusion pattern;

Fig. 23 is an acuity test slide;

Figs. 24 to 26 are stereopsis test slides;

Fig. 27 is a pair of horopter slides;

Figs. 28 and 29 are phoria slides;

Figs. 30 to 34 are fusion pattern slides;

Fig. 35 is a dioptric test slide;

Figs. 36 to 46 are aniseikonia test slides;

Fig. 47 is a diagram illustrating the appearance of an image projected with slides according to Fig. 24;

Fig. 48 is a similar diagram, illustrating the appearance of images projected with slides according to Fig. 34;

Fig. 49 is a diagrammatic representation of a horopter test;

Figs. 50 and 51 are diagrams explaining a declination test; and

Figs. 52 to 55 are diagrams explaining aniseikonia tests.

*General method and arrangement.*—Referring with regard to various terms and fundamental concepts herein involved, especially concerning aniseikonia, to Patents Nos. 1,946,925; 1,933,578; Reissue No. 19,841; 2,063,015; and 2,095,235, the general aspect of the ocular test according to our invention will first be explained by referring to Fig. 1, without describing in detail any of the testing operations or devices.

Figure 1:
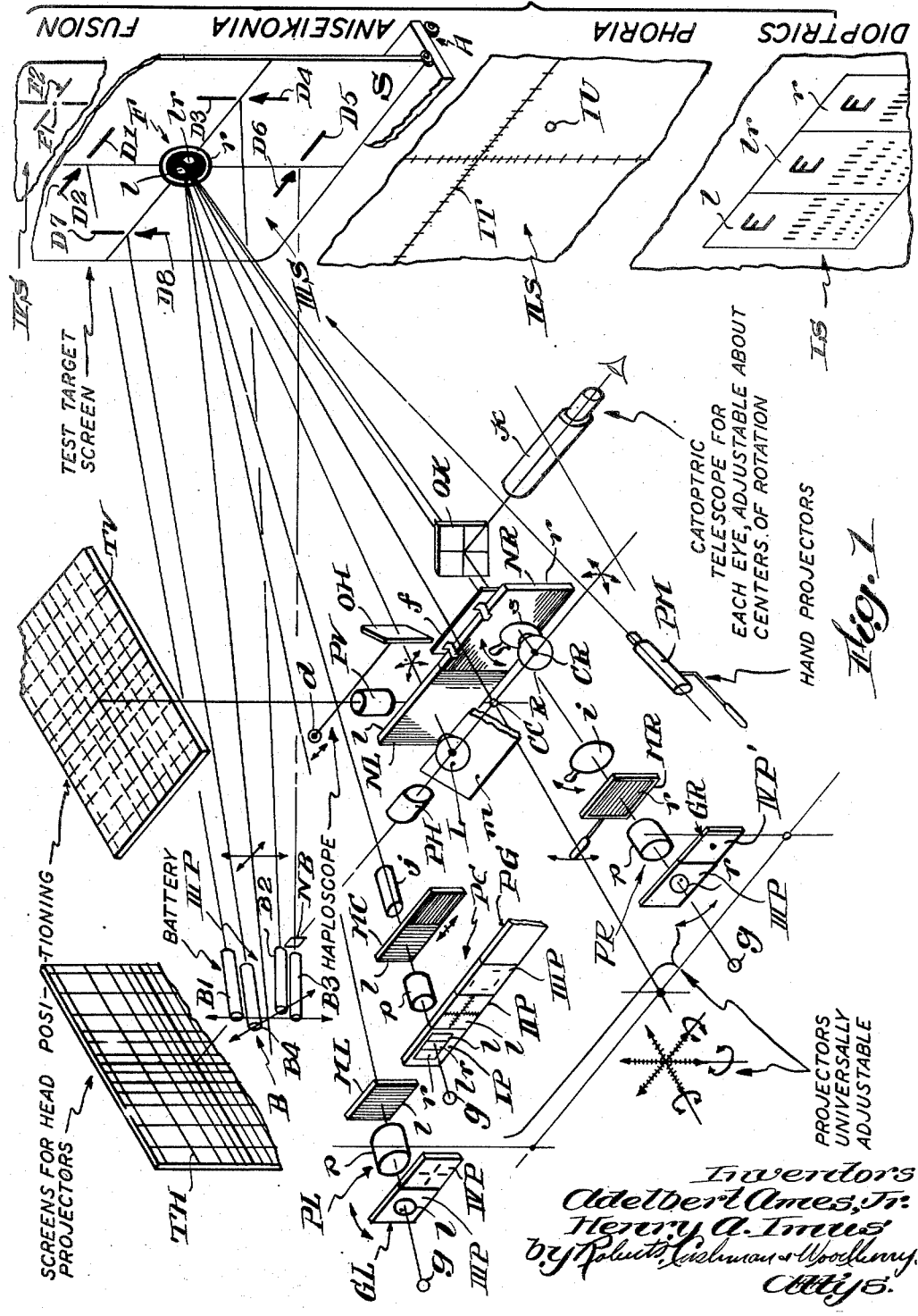
Fig. 1 is a diagram illustrating the general principle of the invention.
Figure 36:
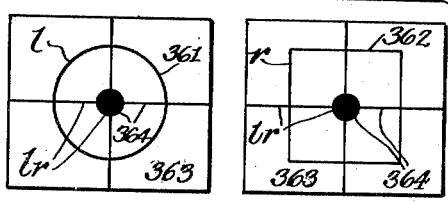
Figure 37:
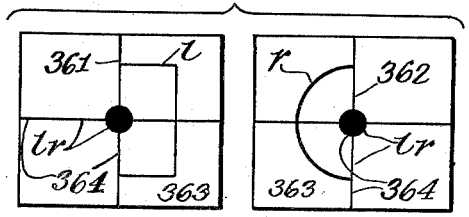
Figure 38:
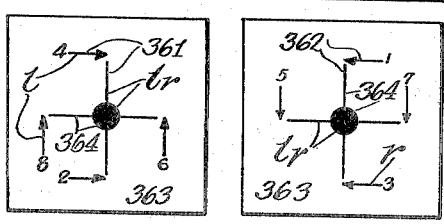
Figure 39:
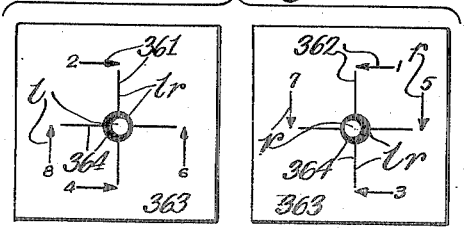

In Fig. 1, the location in space of eyes R and L of a person is, for example, determined by means of projectors PV and PH fastened to the patient's head and directing light rays towards graduated screens TV and TH, respectively. In front of the left and right eye are arranged light polarizing screens NL and NR, respectively, for example of the type described in Patent No. 2,011,-553. The axes of polarization of these screens are inclined at an angle of 90°, so that light polarized in the axis of one sheet will be substantially absorbed by the other sheet. Herein, polarizing elements effective in the same manner as screen NL, and light polarized by such elements will be indicated by letter $l$, elements and light similarly related to screen NR by letter $r$, $l$, $r$ will signify two identical patterns projected in register with $l$ and $r$ light, respectively, and elements and light not having any polarization characteristic will also be denoted by $l$, $r$, the physiological effect being in both instances essentially similar.

Provisions are made to arrange before each eye optical elements, as test lenses or prisms; in Fig. 1, such provisions are indicated by trial lens $s$. Masks excluding extraneous influences inducing binocular depth perception may be provided, for example by hanging on screens NL and NR sheets (indicated at $f$ for screen NR) with round and square openings, respectively. In order to permit convenient observation of the eye positions by the clinician, an inclined mirror (or mirrors; indicated at $m$ for the left eye only) may be arranged which reflects upwardly images of the eyes.

In order to carry out catoptric observations, a telescope with light source may be arranged for rotatory adjustment about the centers of rotation of the respective eyes. Fig. 1 indicates, by way of example, a mirror OK for reflecting light from catoptric telescope K into the right eye and from the eye back into the telescope; both mirror and telescope are mounted on a carrier rotating about center of rotation CR.

In order to permit certain investigations, for example direct dioptric measurements, a haploscopic device may be provided for either eye. Such an arrangement is indicated in Fig. 1 by reflector OH (preferably transparent) and dioptric test target $d$, arranged for rotation about the horizontal and vertical axes of rotation of the eye. An instrument similar to that described in Patent No. 2,095,235 may be adapted for this purpose as well as for mounting the catoptric device.

Arranged as closely as possible to the eyes are light projecting means, Fig. 1 showing by way of example one central projector PC and two side projectors PL and PR, respectively. The projectors have light sources $g$, projector lens systems $p$ and provisions for inserting slides. These may be single slides, as indicated at GL and GR, or slide strips, as indicated at PG for the center projector, permitting quick and convenient change of slides. As indicated, the slides are preferably rotatable about the optical axes of the projectors.

The projectors are further equipped with polarizing screens, for example ML, MC and MR; as indicated at MC, a double screen with elements having axes crossed at 90° may be provided for rapid change from a $l$ screen to a $r$ screen or, as indicated at MR, the polarizing screens may be arranged for rotation about the projector axes, for similar purposes. The polarizing screens should, of course, be arranged for easy removal.

The projectors may be combined with optical devices permitting controllable modification of the projected images; at $i$ of Fig. 1 is indicated a holder arrangement for test lenses, and at $j$ an optical system, for example of the type permitting gradual change of the size of the projected image while keeping it in focus.

As indicated in Fig. 1, each projector is adjustable, if desired universally; scales or indicators for determining the amounts of adjustment are provided.

It is often desirable to adjust in convenient manner and more or less independently the relative location of the elements of a single test pattern, while being able also to adjust or relocate the entire pattern. For that purpose, a so-called battery projector B may be used, having for example four projector components B1, B2, B3, B4, each provided (in similar manner as for example projector PC) with light source, slide, projector lens system and polarizing screen, and independently movable as indicated, whereas the battery as a whole is universally adjustable relatively to the eyes.

The arrangement may further include one or more projectors for manual operation by patient or clinician, indicated at PM of Fig. 1. Such projectors may likewise be equipped with slides and polarizing screens.

Arranged in front of patient and projectors is a screen S covered with material reflecting polarized light without substantially affecting the polarization, as for example a coating of aluminum. The screen S may be fixed to the floor or other support coordinating patient, eye equipment and projector equipment, or it may be adjustable as to distance from and inclination to the eyes, as indicated at A of Fig. 1 by a movable platform to which screen S is hinged.

For the overall illumination of the screen an intensity should be selected which permits perception of projected images which are lighter as well as darker than the screen surface itself.

For testing eyes according to our invention, the patient's head is, for example, located, as above mentioned, by attaching to his head projectors PH and PV thereby indicating the head position on screens TH and TV. By using proper slides and polarizing screens in the projectors and corresponding screens before the eyes, the patient is now presented with test patterns, for example the following basic ones for dioptric, muscular and aniseikonia tests, as follows:

As indicated at IS and IP of Fig. 1, slide G is adjusted to cause the projection of a dioptric test pattern for example in the shape of three customary Snellen charts, which, however, are differentiated by means of polarization. For example, the two outer charts of slide element IP may be covered with $l$ and $r$ polarizing material, respectively, whereas the center chart of the slide is not screened. If the patient's eyes are screened with $l$ and $r$ polarizing material, as indicated at NL and NR, he will see the projected $l$, $r$ image of the center chart with both eyes, the $l$ image with the left eye, and the $r$ image with the right eye. Similar results could be obtained by projecting unscreened single charts with side projectors PL and PL equipped with $l$ and $r$ polarizing screens, respectively, and projecting a third chart or fusion pattern with center projector PC using unpolarized light. It will be evident that binocular fixation is secured in this manner, whereas each eye can be separately (monocularly) tested for dioptric defects. The dioptric defect can be determined by correcting the eyes with test lenses at $s$, or the test pattern size may be changed by appropriate means, for example optical system $j$.

For phoria tests, a graduated pattern II may be projected on the screen as image IIS, through $l$ material and therefore only visible to the left eye. A light point IIU is projected, for example with $r$ polarized light, by means of hand projector PM. The clinician sees the entire test pattern IIS and IIU with both eyes, whereas the patient sees IIS with the left, and IIU with the right eye only. It will be evident that muscular defects can be detected and measured by comparing the actual location of IIS and IIU when the patient adjusts projector PM causing IIU to appear to him at center o of IIS, or by comparing the relative location of IIS and IIU as appearing to the patient when the operator directs IIU to fall on o. By inserting optical prism means at $s$ before the patient's eyes, prismatic corrections can be evaluated.

For investigating aniseikonia, a pattern IIIS comprising a fusion object F and companion object D1 to D8 is often used. The fusion pattern F may be produced on screen S by projecting with $r$ light a circle and a decentered point by means of slide GR and projector PR, as indicated, and a similar circle and a point, decentered to the other side, with $l$ light through projector GL. The circle of F will then be visible to both eyes, whereas each point is only visible to one eye. Hence, the fixation object will appear three dimensional as indicated in Fig. 2, provided, of course, that the patient is at all able to fuse. This stereoscopic type of fusion object is especially adapted to induce and to hold fusion. As a comparison pattern, four lines D1, D3, D5, D7 may be projected with $l$ light through the center projector PC, as indicated at IIIP, combined with arrow lines, indicated at D2, D4, D6, D8, and projected with $r$ light, for example by means of battery B. If the clinician aligns, for his binocular vision, the $l$ and $r$ lines as shown at IIIS, the patient will observe apparent deviations of the lines if he has aniseikonia. By adjusting the individual projectors of the battery, or by optically changing for example (with $j$ in the case of overall aniseikonia) the dimensions of the $l$ pattern, or by appropriately adjusting or setting trial lenses $s$, the aniseikonic defect can be measured.

If it is desired to measure dioptric defects directly, test object $d$ can be moved on the arms of haploscope H; by swinging the haploscope arms, muscular defects can be investigated.

By projecting the reflections of a light point from surfaces of the catoptric telescope K by way of mirror OK into an eye and observing the reflected light points through the telescope, conditions of the optical surfaces of the eye can be investigated in well known manner.

For testing fusional response, foveal as well as peripheral, a test object IVS may, for example, be used, comprising two dissimilar patterns F1 and F2, respectively. One pattern is presented to the left eye only and the other to the right eye only, for example by means of the side projectors, as indicated at IVP and IVP' of Fig. 1. When fusion is normal, F1 will appear to move relatively to F2 with relative movements of the respective eyes. The amount of movement can be measured through the displacement of F1 and F2 reported by the patient, or by the lantern adjustment necessary to center F1 relatively to F2. It is very important that the test pattern elemens of an object of this type can be moved together over the entire field, permitting examination of foveal as well as peripheral fusion, and testing of variations in fusional response in different parts of the field, by correspondingly moving the fusion objects.

For testing long distance vision, screen S will be arranged at a distance from the eyes of preferably not less than 6 m., with the horizontal line of vision normal to the screen. For testing vision at the second principal position, that is as when reading, a screen will be placed at about 40 cm. from the eyes and normal to a line of vision directed downwardly at an inclination of about 20° to the horizontal. It is quite feasible to employ one and the same screen for both positions, by means of the above-mentioned provisions, as indicated at A of Fig. 1. Instead, two separate screens may be used. It will now be evident that the size of the images produced on the screen can be readily controlled, so that any visual angle, coordinated to any type of test at any distance, can be obtained.

Although polarized light is preferably used for carrying out our invention, it is understood that other possibilities of light differentiation could be employed, for example the use of colored light in place of polarized light. Instead of using light polarized in different planes, and screens before the eyes which correspondingly absorb the differently polarized light, colored light and correspondingly colored filters before the eyes could be used. For example, yellow and green light with filters only transmitting yellow or green, respectively, may be employed, together with white light for fusion patterns to be visible to both eyes, instead of the $l$ elements, the $r$ elements and the $l, r$ elements, respectively. The yellow and green spectral ranges are preferable to the red and green ranges, for example, because chromatic abberation in the eye regarding green and yellow is practically negligible.

It will now be apparent that our new testing method makes possible, with simple means, an extremely comprehensive and accurate, and yet simple test whereby all possible ocular defects can be investigated as to their correlated as well as individual characteristics. More detailed descriptions of the various phases of representative tests and of the apparatus preferably used for carrying out these tests will now be presented by way of example, for the purpose of promoting a better undestanding of the invention.

*Ocular equipment.*—Referring to Figs. 1 to 10, those aspects of the invention will now be described which relate particularly to locating and observing the eyes and to optically affecting the light reaching them.

As mentioned above, it was found practical, and in many instances preferable, to supervise the spatial relation of eyes, head and test objects optically rather than by means of mechanical devices.

As shown in Figs. 1, 3, and 5, the patient is provided with a head gear, for example consisting of two bands 1 and 2, carrying two small projectors PH and PV by suitable means, for example ball and socket joints 3 and 4, respectively, the projectors being supplied with current through cord 5. These projectors are so arranged that their optical axes pass as nearly as possible through the center of rotation of the head, or the cyclopean eye, as indicated in Fig. 6. The patient is placed between screens TV and TH, which are provided with two-dimensional scales, for example of the type usually carried by the so-called tangent screens. The head of the patient may be entirely free, or he may be assisted, for example, by a portable chin rest 11 supported on stand 10 (Fig. 3). The two projectors trace on their respective screens with light points the vertical and horizontal axes through the patient's head; in this manner the clinician is enabled continuously and reproducibly to supervise the head position and exactly to trace head movements. In primary position, the narrow light beams coming from projectors PV and PH are falling at the centers of screens TV and TH, respectively. Other positions of the head can be obtained either by maintaining the light spots at other points of the screen or by moving projectors PH and PV relatively to the head gear so that the light spots fall on the screen centers for other than primary head positions. It is often important to control the position of both head and eyes relatively to the test object, since the ability to fuse depends to some extent on the relative positions of eyes and head which, therefore, must be taken into account and reproducibly established. The eyes being located by looking at a test object, and the head by means of the above double projector device, these conditions are fulfilled. Also, the head can be moved to any measured degree by retaining eye fixation, or the eyes can be moved by moving a fixation object, while the head is maintained fixed.

Together with the above described head positioning device is preferably used a stand (Figs. 1, 3, 9, and 10) resting on, or screwed to the floor and carrying the eye equipment previously described. A block 21 with extension rod 22 is fastened to stand 20 for horizontal and vertical adjustment by means of screws 23 and 24. Instead of having a separate support 10 as shown in Fig. 3, chin rest 11 may be fastened to stand 20, as shown in Fig. 10. Fastened to block 21 are lens holders 25 for trial lenses $s$, observation mirror $m$, polarizing screens NL, NR, and diaphragms $f$.

In the embodiment shown in Figs. 7 and 8, trial lens holders and polarizing screens are fastened to a haploscopic instrument H in a manner which will be evident, for example from Patent No. 2,095,235. From this patent it will also be understood that the continuously adjustable size lens system described in copending application Serial No. 713,701 can be mounted either on stand 20 or on haploscope H. Figs. 6 and 8 illustrate further the possibility of using a head support with chin and forehead rests instead of the projector device shown in Fig. 3. These figures also show the manner in which a dioptric test target $d$ and a catoptric device K can be mounted on the arms of a haploscopic instrument, for purposes of combining corresponding tests with the tests by means of projected differentiated test objects.

*Projector equipment.*—Referring to Figs. 1, 3, 4, and 11 to 19, the projector equipment of preferred embodiments of the invention will now be described. Fig. 1 shows a center projector PC, and two side projectors PL and PR at a certain distance from the center projector. This arrangement, although for many purposes sufficiently accurate, involves certain inaccuracies due to the fact that the different inclinations between screen, and optical axis of the projectors and visual axis, respectively, might cause undesirable dimensional discrepancies between the images of test pattern elements projected from different lanterns. The arrangement shown in Figs. 11 to 13 is more satisfactory in this respect. This arrangement employs mirrors which bring the origins of the side projector light beams fairly close together and permits easy handling of the projectors which can be arranged at convenient distances from each other.

A table 31, if desired fastened to the floor or other base 32, supports a mirror pedestal 33, two side projector bases 34 (only one side projector is shown in Fig. 11, the other being symmetrically arranged), and a center projector pedestal 36 (Fig. 12). Each side projector base supports a baseboard 37 with standard 38 and capstan screw 39. Hinged to standard 38 is frame 41 with projector CR and optics support 42. The projector may be of the standard magic lantern type, but the slide carrier 42 should be of the rotary type and provided with scale and index 43. Support 42 should permit easy interchange of polarizing screens and optical systems indicated at $i$ and $j$ of Fig. 1. Scales and pointers 44 permit reading of the inclination of the projectors.

Top 51 of center projector pedestal 36 (Fig. 12)

carries a baseboard 52 pivotally fastened at 53. A screw 54 extending through an arcuate slot of top 51 permits rotary adjustment of board 52 and fixation of the latter to top 51. A pivot bracket 55 of board 52 supports projector PC, and a screw arrangement 56 permits adjustment of the projector about pivot 57. Scale and index means 58, 59 may be used for determining the rotatory projector adjustment in vertical and horizontal planes, respectively. Similar to the side lanterns PR and PL, center projector PC has a slide support 61 and an optics support 62, both being preferably rotatable about the projector axis.

Mirror pedestal 33 supports a mirror baseboard 71 (Fig. 13) carrying two mirror holders 72 and 73 pivoted to the board at 74 and 75. The baseboard itself is connected to pedestal 33 by a pivot pin 76. Scales and pointers 77 and 78, respectively, permit reading of the position of the mirrors relatively to baseboard 71, and by tightening screws 81 and 82, the mirrors can be fixed relatively to the board. Scale and index 83 relate board 71 to pedestal 33.

Mirrors 86 and 87 are fastened in vertical position to holders 72 and 73, respectively, and it will now be evident that they can be adjusted separately or together, permitting the separate relocation of each side projector image and also of both images together.

The freely adjustable hand projector indicated at PM of Fig. 1 may be of any suitable type; a preferred form is shown in Fig. 14. In this figure, 91 is a stand which may have a base, as shown, or may be screwed to the floor or other support. The projector PM proper is equipped with slide magazine 92, swivels 93 and 94 for horizontal and vertical movement, respectively, and receptacle 95 for polarizing screens. A handle 96 permits convenient adjustment by the patient or the clinician. Several of these projectors may be required, as indicated in Fig. 2. They may be used for projecting test patterns, or for example as pointers permitting patient or examiner to indicate details of the test pattern on the screen.

Instead of using two mirrors as shown in Figs. 11 and 12, the optical axes of the side projectors may be brought to coincidence by employing a divided projector lens system or an interlaced reflector or prism system. The latter possibility, providing a substantially ideal side projector arrangement, is indicated in Fig. 15, where 97 and 98 are the reflecting surfaces and 99 is the common optical axis. With an arrangement of this type, the entire image adjustment would preferably be taken care of by means of the projectors themselves.

It will be understood that each projector as well as the mirror system could be made universally adjustable, and that the adjusting movements of any group of projector elements could be coupled. Also, the beams could be moved by means of adjustable mirrors only, in which case the projectors could be fixed to a support in any convenient position. It will further be evident that, as indicated at 49 of projector CR (Fig. 11), each projector may be equipped with special optics, as for example trial elements as size lenses or prisms, systems changing the image magnification without affecting vergence power, or changing dioptric power without affecting the magnification. Remote controls of such systems, for operation by patient or clinician, can be easily arranged, as will be understood without detailed explanation. As already mentioned, the slides are preferably rotatable. The polarizing screens and their holders should be arranged for easy removal and re-insertion of the latter after having been turned 90°. A switch and a rheostat for each projector lamp are preferably provided at easily accessible points, so that the projectors can be conveniently brought into, and eliminated from operation, and the light intensities of the images on the screen properly correlated.

Sometimes it becomes desirable to introduce an intermittent stimulus. This is accomplished by using a flicker arrangement including, for example, a shutter 101 (Figs. 11 and 12) driven by motor 102 through a suitable transmission 103. A drive permitting speed variations within a range of 100 to 6000 R. P. M. of the shutter disk was found suitable. As shown in Fig. 11, the circular disk has a window 104 covering one half of the disk area; a counterweight 105 is preferably provided to balance the disk. The fact that the peripheral portions of the retina are more sensitive to the flicker effect than the center, can be taken care of by projecting the peripheral portions of a given test pattern with the side lanterns having the flicker equipment, whereas the central portion is produced with the third projector, not affected by the flicker disk.

In order to show the adaptability of the new ocular test, an alternative arrangement will now be described, with reference especially to Figs. 7 and 8 and 16 to 19. As indicated in Figs. 7 and 8, a haploscopic device H similar to that shown in the above-mentioned Patent No. 2,095,235 is fastened to table 111. As previously mentioned, the head rest 11 of this device is used and likewise its trial lens equipment and its light deviating mirrors OH or OK (Fig. 1). A single center projector PH is fastened to table 111 by means of clamp 112 having vertical pivot 113 and horizontal pivot 114 for purposes of moving the projected image relatively to the screen means.

The battery B, shortly described with reference to Fig. 1, lends itself very well for use in this test arrangement, although it may well be used with a set up similar to that shown in Figs. 3 and 4, for example, instead of center projector PC. In combination with a set up as shown in Fig. 8, the battery is preferably placed on an extension table 121.

Referring now especially to Figs. 16 to 19, a projector battery will now be described. Table 121 supports a plate 123 which can slide on the table around a pivot and fixation screw 124. Plate 123 has a base yoke 125 to which, at 126, is hinged battery base 131. By means of a capstan screw 127, base 131 can be swung around pivot 126. Scales (not shown) for measuring the adjustments around 124 and 126 may be provided.

Base 131, for example a casting, has a dial panel 132 and a projector tube frame 133. Four dial control shafts 134 (Fig. 16) are journaled in panel 132, carrying dial knobs 135 with dial scales 136 (Fig. 17) on the outside, and cams 137 on the inside. Tube frame 133 supports four U-shaped projector element carriers 138 (Fig. 17), provisions for initial adjustment being made for example by means of leaf springs 139 and screws 140. Pivotally fastened to carriers 138 are the front ends of projector elements B1, B2, B3, B4, (compare also Fig. 1), whose back ends are correlated with cams 137 and knobs 135, for example by means of follower arms 141, brackets 142, adjustment screws 143 and springs 144 held within panel 132 by screws 145. It will now be evident that the battery as a whole can be adjusted in order to coordinate the entire projected pattern with the screen, and that each individual pattern element as projected by the individual projector elements can be separately adjusted, and the adjustment read by means of dial scales 136.

As indicated in Fig. 16, the projector lamps are supplied with current through cords 147; slides 148 can be exchanged, and polarizing means NB adjusted by suitable means.

As will be apparent from the description of test methods given hereinafter, as many as six or more projectors may be used, whereas it will sometimes be possible to make satisfactory tests with a single lantern, or two lanterns, and a spectacle frame. Battery B may be combined with such a simple set up, or, as indicated in Fig. 1, with the more elaborate arrangement shown in Figs. 3 and 4. It will now be evident that the new test is adaptable to the most varied conditions and requirements and does not require any precisely made and adjusted mechanical equipment, since the correlation of the test patterns can be supervised and changed simply by observing the screen. Even the simple adjustment provisions herein shown by way of example are comparatively elaborate and, although desirable, may be replaced by simpler arrangements as mounting boards and clamps.

Figure 20:
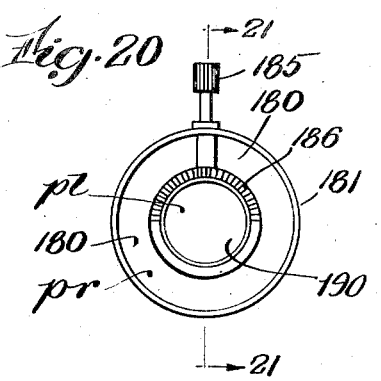
Fig. 20 is a front elevation of beam splitting device.
Figure 21:
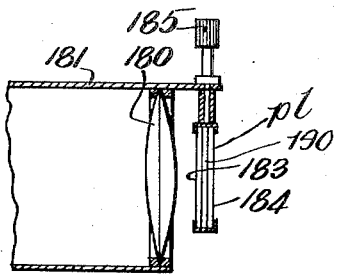
Fig. 21 is a section on lines 21—21 of Fig. 20.

For the relative adjustment of $l$ and $r$ images, respectively (for example for purposes of the test indicated at IV of Fig. 1), a projector may be provided with a continuously adjustable beam splitting device. Figs. 20 and 21 illustrate an embodiment of such a device. In these figures, 180 indicates the objective lens system of a projector 181. Fastened to the lens mounting at 182 is a system 190 of two prisms 183 and 184 relatively rotatable by means of knob 185. As well known in the art, the prism power of such a system varies with the relative position of the two component prisms and can be read by means of a scale 186. As indicated in Fig. 20, the aperture ring not covered by system 190 is provided for example with $r$ polarizing material $pr$, and system 190 itself with $l$ polarizing material $pl$. If the prism power is zero, the $l$ and $r$ images of the projector slide will coincide; upon increasing the prism power by turning knob 185, these images will gradually move apart. It will be understood without detailed explanation that arrangements for rotating the polarizing screens, or both images, or each image separately can be provided, and that other light splitting devices could be suitably adapted.

*Screen equipment.*—As mentioned with reference to Fig. 1, one type of screen now preferably used consists of a plaster base having an aluminum coating; a cloth base is also suitable. We found that such a screen does not substantially interfere with the polarization characteristics of light reflected therefrom. An ideal set up would be one with a screen spherically curved about the cyclopean eye of the patient, with the projector optics also centered at that point. By comparatively complicated optical arrangements this ideal condition could be fulfilled. A cylindrical screen curved about an axis through the cyclopean center CC (Fig. 1) may sometimes be desirable, but for most practical purposes the equipment above described is fully satisfactory in combination with a flat screen substantially normal to the visual axis of the patient. In order to fulfill the last mentioned condition, the screen may be made adjustable as shown in Figs. 3 and 4. In these figures, 151 are tracks supporting by means of rolls 152 a screen platform 153 to which is pivoted at 154 a yoke 155 for screen S which swings in 155 on journals 156. Scale means 157 permit reproducible adjustment, and fixation screws (not shown) may be provided in suitable manner.

A screen of this type may be used for far as well as near vision, and for any intermediate position that may be desirable. By rotating it about its vertical axis, the relative size of images projected onto opposite sides of the screen may be changed and measurably adjusted, as indicated at S' of Fig. 3.

Fig. 7 shows an embodiment with two screens; distant vision screen $Sd$ is fastened to floor or other support 32, whereas a small screen $Sn$ is fixed to table 111, for near vision (reading) tests. Projector PH may be used for either screen, but in this embodiment we prefer a different type of near vision screen, a preferred embodiment of which will now be described.

As shown in Figs. 7 and 8, table 111 supports a small screen plate $Sn$, preferably of glass, being provided with a thin layer of aluminum (for example applied by sputtering), which layer partly reflects and partly transmits light, a device well known in the optical art, for example for light dividing reflectors. A small projector PR likewise fastened to table 111 and preferably arranged for universal adjustment, is used for projecting test images onto the back side of screen $Sn$. We found that semi-aluminized screens of this type transmit as well as reflect light without appreciably changing its polarization characteristics as far as they are used for present purposes.

Similar to the above described arrangement, a semi-transparent screen may be used with a rear projector, or projectors, for example, for distant vision tests, with a set up according to Fig. 3. This set up may be employed with the battery B not in front of screen S but in the rear of a similar, but semi-transparent screen SS, as indicated in Fig. 4.

A semi-transparent screen may also be used for producing depth fusion patterns with an arrangement according to Fig. 22. Two lamps 221 and 222 project light beams through a circular opening 223 of mask 224 onto screen SS, the light being $l$ and $r$ polarized, respectively, as indicated. The eyes being provided with $l$ and $r$ polarizing screens NR and NL observe only the respective polarized light spots 225, 226 on the screen, the resulting stereoscopic effect causing a single dot to appear beyond or in front of the screen. By gradually changing the distance of lamps 221, 222, the distance of light spots 225, 226 can be similarly changed, thereby correspondingly modifying the apparent distance of the binocularly fused spot from the screen. This device is especially suited for investigating depth perception latitude, as it permits a gradual approach to the point where fusion breaks.

As mentioned above, the semi-transparent screen shown in Figs. 7 and 8 may be used with lantern PH (Fig. 7) projecting test patterns upon its front surface, since the semi-transparent screen, while obscuring to the eyes of the patient objects therebehind, makes visible light projected thereon from either side. As shown in Fig. 7, a hinged cover 231 may be added to screen $Sn$, for example a plain aluminum sheet, if it is desired to use an opaque screen instead.

It will now be evident that the screens for reflecting or transmitting (or both) polarized lights can be made opaque for receiving light from one side only, or semi-transparent for receiving light from either one or both sides.

*Slide equipment.*—For projecting test patterns on the test screen various types of slides carrying such patterns in the form of sections of different transparency, or analogous devices can be used, a selection of which will now be generally discussed, a more detailed explanation of their function being reserved for a description of various representative applications of the new test method.

It will now be evident that the invention makes use of unpolarized light and of light polarized in different planes, herein referred to as $l$, $r$, $l$ and $r$ polarized light, respectively. Each lantern, through appropriate slides, may be used to project light of any one particular type, either polarized or unpolarized. In that case, a polarizing screen is preferably inserted in the light beam at any convenient point, for example by covering the slide itself with a polarizing sheet or by using a screen as at MC, MR or ML of Fig. 1. By arranging for interchangeable screens (as at MC of Fig. 1) or for rotation of the screens (MR) the polarization plane can be changed. Unpolarized patterns $l$, $r$ can, of course, be obtained by removing a screen; but it is also feasible to project superimposed images of similar patterns with $l$ and $r$ polarized light, respectively, which $l$, $r$ patterns will then be visible to both eyes although, and this is very important, they can be easily separated by adjusting their individual sources.

It is further possible to project polarized as well as unpolarized light with a single projector, by covering portions of a slide with appropriately orientated polarizing material.

There are several possibilities of relatively adjusting the images on a screen. With slides fixed in separate projectors, the images may be moved by moving the projectors relatively to each other; slides with mechanically adjustable portions (for example similar to the targets shown in Patent No. 1,944,871) may be used; or the light beams of the projector may be optically adjusted as by adjustable projector lens systems (change of focus), lens systems (image size or shape changes), or prisms (asymmetric displacements). Needless to say, scale means can be applied to all adjustment movements; in many cases it will be preferable to incorporate scales as part of the test pattern, which permits direct quantitative detection of the defect in question, especially of aniseikonia or muscular defects (phorias and tropias).

A number of representative slide systems will now be described by way of example, with reference to Figs. 23 to 54.

Fig. 23 shows an acuity chart, already shortly described with reference to IS of Fig. 1. In this slide, the center part 250 transmits unpolarized light, whereas the side parts 251 and 251 transmit $l$ and $r$ polarized light, respectively. Instead, three slides similar to center portion 250 can be used in three different projectors, the lanterns projecting the two side images being used with $l$ and $r$ polarizing screens, respectively, and adjusted to produce on the screen a combined image resembling Fig. 26.

In this connection it should be noted that either the slide pattern or the background may be transparent, in accordance with the test conditions in every instance; the drawings are not made with regard to the actual transparency differences of the various slide sections, but rather with a view to simplification and uniformity.

In the following explantation, the slides or slide portions described as provided for $l$ or $r$ light, respectively, may be either glass slides of the common type for use in projectors having separate polarizers, or these portions may themselves be covered with polarizing material, as for example above described with reference to Fig. 23.

Fig. 24 depicts a pair of stereopsis slides for use in two respective (for example side) projectors, one for $l$ and the other for $r$ light. Rings 253, 254, 255L, 255R and points 256L, 256R will appear as shown in Fig. 47.

Fig. 25 is a pair of slides, for two $l$ and $r$, respectively, projectors, representing the well known "Keystone pattern" consisting of geometrical elements 258, adapted for purposes of the present invention, or on a transparent ground 259 which is $l$ or $r$ polarized for the two slides, respectively.

Fig. 26 is a pair of slides forming a stereoscopic tipping field pattern; the slides have identical irregular design 268 on $l$ or $r$, respectively, polarized ground 269; the images are somewhat displaced on the screen.

Fig. 27 is a pair of identical slides to be used with $l$ and $r$, respectively, projectors, each having a series of transparent verticals 271 on ground 272; these slides are used for a horopter test.

Figs. 28 and 29 are phoria charts, each to be used in a separate $l$ or $r$ projector. Fig. 28 represents a grid 281 divided in arc degrees, on a ground 282, and Fig. 29 a two-dimensional tangent scale 291 on ground 292.

Figs. 30 to 34 are fusion patterns; Fig. 30 represents a pair of identical slides for projecting a polarized fusion pattern, that is a pattern composed of two identical, superimposed $l$ and $r$, respectively, images produced for example by squares 301 on ground 302. Fig. 31 is a small light spot, for use in a hand projector PM, for example, 311 being a transparent dot on opaque ground 312. Figs. 32 and 33 are single slides for similar individual use, and represent an arrow 321 and a line 331, on ground 322 and 332, respectively. Fig. 34 is a single slide; portion 261 is opaque, transparent dots 262 are covered with $l$ polarizing material, and dots 263 with $r$ polarizing material.

Fig. 35 represents a pair of dioptric chart slides for measuring astigmatism, with star patterns 351 on ground 352; they are preferably used in rotatable holders with individual $l$ and $r$ projectors, combined with a fusion image projected by a third lantern.

Figs. 36 to 40 represent pairs of slides for aniseikonia tests, one slide in each instance to be used with $l$ light, and the other with $r$ light. Figs. 41 to 46 show single slides also for aniseikonia investigations, the elements of the comparison pattern being in this instance differentiated by applying polarizing material directly to the slides. The slides, shown in Figs. 41, 42, 44, 45 and 46, require only a single projector for carrying out an aniseikonia test, whereas the slide according to Fig. 43 requires an additional lantern, or lanterns, for projecting a fusion pattern. In each instance, 361 and 362 are preferably transparent designs for the left and right eye, respectively, on an opaque ground 363, the monocularly observed portions being again marked $l$ and $r$, respectively, and the fixation objects being marked $lr$ as above described. Numeral 364 denotes the fixation pattern.

*Operation.*—Referring also to the preliminary explanation of the new test method in general, presented above when describing Fig. 1, several specific instances of testing operations carried out according to the invention will now be described by way of example.

Visual acuity may be tested as described above with reference to IS of Fig. 1, by projecting three Snellen charts, one as fusion object with lr or l, r light, one with l light, and one with r light, for example by means of slide Fig. 23. Instead, only one chart may be projected with polarized light for monocular observation, and the eye under test changed by rotating the polarization screen 90°. Other possibilities are to cover one-half of a single Snellen chart with polarizing material and use it with a single projector, or to project a separate fusion object with unpolarized light and combine it with the polarized image of a dioptric test chart.

For testing astigmatism, a pair of slides, or a single slide, according to Fig. 35 projected with l and r light, respectively, may be used, together with a suitable fusion object, in similar manner as above described. The sharpness of the radii of the respective images will indicate the astigmatic meridians, while binocular vision is maintained. After, by conventional methods, one of the astigmatic foci was conjugated to screen, the amount of astigmatism can be determined with charts as above described with reference to Fig. 23.

A representative phoria or tropia test has been described above with reference to IIS of Fig. 1. Slides which may be used for such tests are shown in Figs. 28 and 29 and in Fig. 31. A slide according to Fig. 29 or 33, respectively, is projected with l or r light, and a slide according to Fig. 31 with r or l light, respectively.

Slide, Fig. 28, supplies a screen image graduated in angular degrees, whereas Fig. 29 illustrates a slide for projecting a screen with tangent scale having the well known advantages of such screens.

By projecting a slide according to Fig. 28 with l light and a similar slide with r light (a simple cross pattern may be used instead), cyclophoria and declination defects may be investigated.

A test pattern combined of similar l and r images and seen by the examiner as a single cross as indicated in Fig. 50, will appear to a patient having a rotational incongruity as illustrated in Fig. 51. The displacement of the centers as well as the angular deviation can be read by the patient; or, the apparent pattern can be made to conform to Fig. 58 by suitable optical means (compare copending application Serial No. 160,784, filed August 25, 1937), or by relatively rotating the slides and shifting the projectors. The amount of the defect can be determined from this adjustment, and the effect of corrective lens means accordingly checked.

Tests of this type often indicate that the defect depends a good deal upon the relative position of eyes and head. In such instances, the determination of the head position by means of a device as shown in Figs. 1, 5 and 6 is indicated.

A basic aniseikonia test has been presented with reference to III of Fig. 1. Instead of using test pattern III of Fig. 1, slides according to Figs. 36 to 39 can be used with only two lanterns, in a manner which will now be readily understood. The relative size of the l and r patterns can, for example, be adjusted by using a size changing optical system with one or both lanterns, or by means of test lens systems before the eyes, or by both these provisions. For patients having squint, the images can be so adjusted that the center portions fuse.

Figure 40:
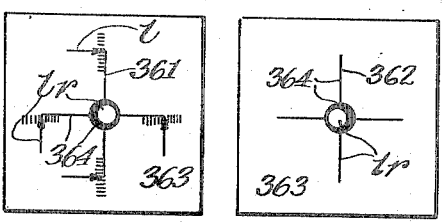

The slide pair according to Fig. 40 provides (like that according to Fig. 39) a depth (stereo) fusion object; it is used with a third lantern projecting an arrow (compare Fig. 32) seen by that eye only which also sees the image projected by the right hand slide of Fig. 40. The third lantern is preferably operated by the patient who brings his arrow successively into apparent alignment with the four arrows visible to the other eye. The scale lines of these latter arrows permit the examiner to read the size differences directly from the projection screen.

Single slides, Figs. 41, 42 and 43 are provided with polarizing material in such a manner that elements, 1, 3, 5, 7 are seen with one eye and elements, 2, 4, 6, 8 with the other eye. Slide, Fig. 41, has a depth fusion object with the dots visible to respective eyes; slide, Fig. 42, has a simple non-polarized fusion object, and slide, Fig. 43, is used with a separate fusion object projected from another lantern, or, preferably, with a screen having a black dot painted thereon. Slide, Fig. 42, has angles and lines, respectively, instead of arrows as in Fig. 41, for the purpose of avoiding confusion which sometimes occurs with slides of the pattern according to Fig. 41, when the common fusion object does not hold fusion exactly, or when there is a slight phoria. A depth fusion pattern could be used with this slide, similar as in Fig. 41.

The slide according to Fig. 44 has arrows or similar elements, with scale lines, seen by one eye, and a fusion object seen by both eyes; the spaces opposite the arrows receive mechanically adjustable elements visible to the other eye. Otherwise, this test is similar to that described with reference to Fig. 40.

The single slides according to Figs. 45 and 46 have a stereo fusion object as indicated, a scale and horizontal line visible to one eye, and a horizontal line visible to the other eye. These slides are used for measuring vertical and horizontal size difference, respectively, without eye movement, as will now be explained.

The tests now to be described are selected as examples of tests which could hardly be carried out according to previously known technique. In previous tests, there may take place a change of the direction of gaze; in the tests now to be described, the direction of gaze is constant. This has the advantage of eliminating any possibility of influence of muscular anomalies that might be associated with a change of the direction of gaze.

Fig. 52, as well as Figures 53 to 55, (in which a simple fusion pattern is indicated in order to simplify the drawings), show in the left-hand column the test pattern as it actually appears on the screen and, in this form, is visible to the examiner, whereas the right-hand columns show the respective pattern as it appears to the patient.

Two arrows, for example, are projected by means of slides Fig. 32, with l and r light, respectively, from two separate projectors. The patient, equipped with corresponding l and r polarizing screens, will see the arrows aligned as indicated at A of Fig. 52, because there is no inducement to fuse. This appearance is quite independent of the presence of an aniseikonic defect. A fusion object is now introduced into the periphery of the field of vision, for example by projecting a slide, Fig. 45 or 46, with unpolarized light. If the patient has an ocular image difference in the vertical meridian he will observe the arrows to separate while he continues to fixate them in the center of the field of vision; compare B of Fig. 52. It is herein presumed that the ocular image of the right eye is larger than that of the left eye. The arrows will separate the further the greater the distance of the fusion object from the arrows at the center, and the greater the ocular image incongruity, as will be clear when considering that the distance between the arrows represents the difference of the distances of two corresponding pairs of ocular image points, which difference increases with distances increasing due either to outward movement of the fusion object or increase of the ocular image difference. The latter effect can, of course, be proved by providing an eye of the patient with different zero power size lenses; at C of Fig. 52, this effect is illustrated for a different fusion object position.

This test can be evoluated in various ways. If a scale is projected with one of the arrows (compare for example Figs. 45 and 46), the patient can directly read the size difference. By means of a slide according to Fig. 44, the examiner can bring the arrows back into coincidence, and read the size difference on his scale. By applying corrective trial lenses, the arrows can be brought to coincidence, the defect being indicated by the trial correction.

Fig. 53 illustrates a modification of the above test. Instead of a fusion object projected with unpolarized light, the examiner uses a fusion object combined of two similar patterns projected in superimposition from two adjustable lanterns, with $l$ and $r$ light, respectively. At A of Fig. 53 the initial appearance of this pattern to the examiner, to a person not having a size difference, and to a person having a size difference (again right eye ocular image larger) are indicated. If now the fusion squares are moved apart in vertical direction (B of Fig. 53), the arrows will move apart for the person with unimpaired vision, while the aniseikonic patient will see them in coincidence, if the distance of the two fusion patterns corresponds to his size defect. Upon moving the fusion pattern still further apart, short of breaking fusion (C of Fig. 53), the iseikonic person will see the arrows still further apart, whereas the anisekonic patient observes a discrepancy opposite to that illustrated at A.

With this set up, the ocular image discrepancy can be measured by means of the actual distance of the two components of the fusion pattern when the arrows coincide; this distance will correspond to the apparent distance of the arrows when the fusion pattern components are in exact superimposition.

By using, in addition to the test pattern indicated in Fig. 53, a fusion object consisting of a simple pattern (for example Fig. 31) projected with unpolarized light, the test illustrated in Fig. 54 can be made. Assuming that the patient does not have a size difference in the meridian in question, position A of Fig. 54 corresponds to the first two squares of B in Fig. 53. If the additional fusion pattern is now projected into the vicinity of the arrows, it will be seen double as indicated at B of Fig. 54. Gradually, however, central fusion becomes stronger than peripheral fusion and the appearance changes, as shown at C. In this manner, the relation of central and peripheral power to fuse can be investigated.

Referring to Fig. 55, a test will now be described for determining whether or not a patient has in a given meridian a symmetric or an asymmetric size defect, the latter type of aniseikonia being for example described in copending application Serial No. 750,162, filed October 26, 1934. For the purpose of this explanation it will be presumed that in the case of both symmetric and asymmetric aniseikonia the upper half of the ocular image for the right eye is larger than for the left eye whereas, for asymmetric aniseikonia, the lower half of the right eye ocular image is smaller. A fusion object is again applied as previously described, and steps A to E of Fig. 55 will now be understood without further explanation. A second fusion object, for example likewise projected with two lanterns, is then introduced from the opposite margin of the visual field, which will have to be adjusted as indicated at F and G of Fig. 55 in order to bring the arrows to coincidence. If the aniseikonia is symmetric, coincidence of the arrows is obtained by adjusting the fusion object components symmetrically, whereas an asymmetric defect requires asymmetric adjustment; both types are indicated at F and G, respectively, of Fig. 55.

It will be noted that the last mentioned test may require seven projectors. Some of these, for example one for one arrow and one or two for a component of the two fusion objects, may be hand lanterns (PM of Fig. 1) permitting the patient to adjust the test pattern. Of course, similar tests can be made for any visional meridian by appropriately arranging the slides.

Stereopsis is preferably checked by means of a pair of slides according to Fig. 24, the individual slides projecting $l$ and $r$ light, and the eyes being equipped with $l$ and $r$ polarizing screens, respectively. There are cases where fusion is present whereas the patient does not have stereoptric vision. In such cases, the patient sees the circles and the point in one and the same plane whereas, with stereopsis unimpaired, the pattern appears as indicated in Fig. 48; it will be understood that dots 481 and 482 are projected with $l$ and $r$ polarized light, respectively, and square 483 with unpolarized or $lr$ light. This is a test as to the quality of stereopsis, whereas the well known Keystone pattern projected with slides, Fig. 25, permits quantitative tests, the various patterns appearing in ten different planes if normal steropsis is present.

The test described with reference to Fig. 22 permits the determination of stereoscopic amplitude. Such tests can also be carried out with the beam splitting device described with reference to Fig. 20 or 21.

Slides according to Fig. 26, used with $l$ and $r$ light, respectively, project a pattern which represents a tipping field according to copending application Serial No. 12,529, filed January 25, 1936. The apparent location in space of this field can be adjusted either with adjustable size lenses either before the patient's eyes or before a projector.

The well known horoptric tests (compare for example "The Journal of the Optical Society of America," vol. 22, page 538) can be carried out by means of a pair of slides according to Fig. 27. One slide being projected with $l$ and the other with $r$ light, this pattern replaces the known horoptric device with adjustable wires. It is used without fusion pattern, the eyes being masked as indicated at *f* of Fig. 49, in which 272 indicates the test pattern as it would appear to the examiner. By optical means indicated at *j*, the respective images as appearing to the patient can be adjusted, in analogy to the adjustment of the wires of the usual horopter instrument.

It will now be evident that the new test provides, among other features apparent from the preceding description, the especially important advantages of permitting binocular tests covering the entire field of vision with the optical axis of the respective eyes moving or arrested at will, with the eyes being disassociated or correlated in binocular fusion, with the test pattern freely and continuously moving over the entire field either as a whole or with any number of components (visible to both or any one of the two eyes) moving independently, and with the locations in space of head, eyes and test pattern positively and reproducibly correlated. As a consequence of the continuous movements and image adjustments, there is no interruption of the inducement to fuse or sudden change of the direction of the lines of vision.

It should be understood that the present disclosure is for the purpose of illustration only and that this invention includes all modifications and equivalents which fall within the scope of the appended claims.

We claim:

1. The method of testing vision comprising presenting to an individual a test device, a section of which is rendered visible by light effectively perceptible to both eyes of the individual, which section constitutes fixation means for the two eyes and two portions of which test device are rendered visible by light perceptible to the respective eyes, and which portions constitutes test means for each respective eye selectively, placing before the respective eyes means rendering each eye unresponsive to the light perceptible to the other eye, placing test lens means having controlled corrective characteristics before at least one of the eyes of the individual while both eyes are looking at said fixation means and said eye is viewing the respective portion of said test means, altering said test lens means until a substantially normal state of vision exists, and determining a defect which may exist by the extent of said altering.

2. The method of testing vision comprising presenting to an individual a test object, rendering a section thereof visible by effectively non-polarized light, which section constitutes fixation means for the two eyes, rendering a portion of said test object visible by light polarized in a certain direction, said portion constituting test means for one of the eyes, placing polarizing means before the other eye with its axis of polarization substantially normal to said direction, comparing the actual pattern of said test object as determined by said section and said portion with its pattern as appearing to the individual, and determining a defect which may exist by the discrepancy between said actual and said apparent pattern.

3. The method of testing vision comprising projecting on a viewing screen within the field of vision of an individual a test object rendering a section thereof visible by light reflected from said screen effectively perceptible to both eyes of the individual, which section constitutes fixation means for the two eyes rendering two portions of said test object visible by light reflected from said screen effectively perceptible to the respective eyes, respectively, said portions constituting test means for each respective eye, placing before the respective eyes means rendering each eye substantially unresponsive to the light perceptible to the other eye, and comparing the actual pattern of said test object as determined by said section and said portions with its pattern as appearing to the individual, and determining a defect which may exist by the discrepancy between said actual and said apparent pattern.

4. The method of testing vision comprising presenting to an individual a test object, rendering two portions thereof visible by light polarized in two intersecting directions and which portions constitute test means for each respective eye, placing polarizing means before each of the respective eyes with one of said polarizing means having its axis of polarization substantially parallel with one of said directions and with the other polarizing means having its axis of polarization substantially parallel with the other of said directions, placing test lens means having controlled corrective characteristics before at least one of the eyes of the individual while both eyes are viewing the respective portions of said test means, altering said test lens means until a substantially normal state of vision exists, and determining a defect which may exist by the extent of said altering.

5. The method of testing vision comprising presenting to an individual a test device a section of which is rendered visible by effectively non-polarized light, which section constitutes fixation means for the two eyes and two portions of which test device are rendered visible by light polarized in different directions and which portions constitute test means for each respective eye, placing polarizing means before each of the respective eyes with one of said polarizing means having its axis of polarization substantially parallel with one of said directions and with the other polarizing means having its axis of polarization substantially parallel with the other of said directions, placing test lens means having controlled corrective characteristics before at least one of the eyes of the individual while both eyes are looking at said fixation means and said eye is viewing the respective portions of said test means rendered visible by polarized light, altering said test lens means until a substantially normal state of vision exists, and determining a defect which may exist by the extent of said altering.

6. The method of testing vision comprising projecting on a viewing screen within the field of vision of an individual a test device a portion of which is rendered visible by effectively non-polarized light, which portion constitutes fixation means for the two eyes and two portions of which test device are rendered visible by light reflected from said screen polarized in different directions and which portions constitute test means for each respective eye, placing polarizing means before each of the respective eyes with one of said polarizing means having its axis of polarization substantially parallel with one of said directions and with the other polarizing means having its axis of polarization substantially parallel with the other of said directions, placing test lens means having controlled corrective characteristics before at least one of the eyes of the individual while both eyes are looking at said fixation means and said eye is viewing the respective portion of said test means rendered visible by polarized light, altering the relative positions of said projected test device portions and altering said test lens means until a substantially normal state of vision exists, and determining a defect which may exist by the extent of said altering.

7. The method of testing dioptric eye defects comprising projecting on a viewing screen within the field of vision of an individual a test device a section of which is rendered visible by light effectively perceptible to both eyes of the individual, which section constitutes fixation means for the two eyes and one portion of which test device is rendered visible by light reflected from said screen effectively perceptible to only one of the eyes and which portion constitutes dioptric test means for said eye, placing before the other eye means rendering it unresponsive to light from said portion, selectively placing power test lens means having controlled dioptric characteristics before said first eye while both eyes are looking at said fixation means and said eye is monocularly viewing said dioptric test means which is visible to said eye and substantially invisible to the other eye, and altering said power test lens means until a corrective power is arrived at, whereby best possible vision of the dioptric test means rendered visible to said eye is obtained while maintaining best possible binocular vision.

8. The method of testing dioptric eye defects comprising presenting to an individual a test device a section of which is rendered visible by effectively non-polarized light, which section constitutes fixation means for the two eyes and one portion of which test device is rendered visible by light polarized in a given direction and constitutes dioptric test means for one of the respective eyes, placing polarizing means before the other eye with its axis of polarization substantially normal to said direction, selectively placing power test lens means having controlled dioptric characteristics before said eye while both eyes are looking at said fixation means and said eye is monocularly viewing said dioptric test means rendered visible by polarized light to said eye and substantially invisible to said other eye, and altering said power test lens means until a corrective power is arrived at, whereby best possible vision of the dioptric test means rendered visible by polarized light to said eye is obtained while maintaining best possible binocular vision.

9. The method of testing dioptric eye defects comprising projecting on a viewing screen within the field of vision of an individual a test device a section of which is rendered visible by effectively non-polarized light, which section constitutes fixation means for the two eyes and one portion of which test device is rendered visible by light reflected from said screen polarized in a given direction and constitutes dioptric test means for one of the respective eyes, placing polarizing means before the other eye with its axis of polarization substantially normal to said direction, selectively placing power test lens means having controlled dioptric characteristics before said eye while both eyes are looking at said fixation means and said eye is monocularly viewing said dioptric test means rendered visible by polarized light to said eye and substantially invisible to said other eye, and altering said power test lens means until a corrective power is arrived at, whereby best possible vision of the dioptric test means rendered visible by polarized light to said eye is obtained while maintaining best possible binocular vision.

10. The method of testing dioptric eye defects comprising projecting on a viewing screen within the field of vision of an individual a test device a section of which is rendered visible by effectively non-polarized light, which section constitutes fixation means for the two eyes and one portion of which test device is rendered visible by light reflected from said screen polarized in a given direction and represents a series of correlated test characters arranged in groups with each group being varied as to respective sizes according to known standards established in the art of eye testing, for dioptrically testing one of the respective eyes, placing polarizing means before the other eye with its axis of polarization substantially normal to said direction, selectively placing power test lens means having controlled dioptric characteristics before said eye while both eyes are looking at said fixation means and said eye is monocularly viewing said test characers rendered visible by polarized light to said eye and substantially invisible to said other eye, and altering said power test lens means until a corrective power is arrived at, whereby best possible vision of the dioptric test means rendered visible by polarized light to said eye is obtained while maintaining best possible binocular vision.

11. The method of testing the deficiencies of the eyes of an individual separately under varying degrees of accommodation comprising projecting a test device by rendering a portion thereof visible by non-polarized light and constituting eye fixation means on a viewing screen within the field of vision of the eyes and on which the eyes may be single binocularly fixed and by rendering other separate adjacent portions thereof having different distinguishable characteristics visible by light polarized in different directions controlled to be in substantially normal relation with each other and constituting test means for each respective eye, placing polarizing means before each of the respective eyes with one of said means having its axis of polarization substantially parallel with the axis of polarization of one portion of the test means rendered visible by polarized light and with the polarizing means before the other eye having its axis of polarization substantially parallel with the axis of polarization of the other portion of said test means rendered visible by polarized light, and selectively placing a plurality of test lenses having varying corrective characteristics before the eyes of the individual under test while the said eyes are binocularly fixed on said fixation means and are monocularly viewing the respective portions of the test means rendered visible by polarized light and altering the powers of the test lenses before each respective eye until a corrective power is arrived at whereby best possible vision of the respective test means rendered visible by polarized light to each respective eye is obtained.

12. The method of testing defects of vision comprising projecting on a viewing screen within the field of vision of an individual a test object, rendering a section thereof visible by light components reflected from said screen polarized in two intersecting directions, which section constitutes fixation means for the two eyes, and two adjacent portions of which test object are shaped to afford comparison with each other and are rendered visible by light reflected from said screen polarized in said directions, and which portions constitute test patterns for the respective eyes, placing polarizing means before each of the respective eyes with one of said polarizing means having its axis of polarization substantially parallel with one of said directions and with the other polarizing means having its axis of polarization substantially parallel with the other of said directions, separating said two components of said fixation object, comparing the actual pattern of said test object as determined by said section and said portions with its pattern as appearing to the individual, and determining a defect which may exist by the discrepancy between said actual and said apparent pattern.

13. The method of testing defects of vision comprising projecting on a viewing screen within the field of vision of an individual a test device a section of which is located substantially at the periphery of said field and rendered visible by effectively non-polarized light, which section constitutes fixation means for the two eyes and adjacent portions of which test device are located substantially in the central region of said field and which are shaped to afford dimensional comparison with each other, which are rendered visible by light reflected from said screen polarized in different directions, and which portions constitute test patterns for the respective eyes, placing polarizing means before each of the respecitve eyes with one of said polarizing means having its axis of polarization substantially parallel with one of said directions and with the other polarizing means having is axis of polarization substantially parallel with the other of said directions, placing test lens means having controlled acteristics before at least one of the eyes of the individual while both eyes are looking at said fixation means and while each eye is monocularly viewing said patterns rendered visible by polarized light, and altering said test lens means until said test patterns appear in a relation indicating correction of a defect which may exist.

14. The method of testing defects of binocular vision comprising presenting to an individual a test device two portions of which test device are located for foveal vision by the individual and shaped to afford locational comparison with each other, rendering said portions visible by light polarized in two intersecting directions, said portions constituting foveal test objects for the respective eyes; placing polarizing means before each of the respective eyes with one of said polarizing means having its axis of polarization substantially parallel with one of said directions and with the other polarizing means having its axis of polarization substantially parallel with the other of said directions, moving a peripheral test object rendered visible by effectively unpolarized light and hence visible to both eyes into said field of vision from the periphery thereof, and altering the relative position of said foveal and peripheral test objects until said foveal test objects appear in a relation indicating a defect which may exist.

15. The method of testing defects of vision comprising projecting on a viewing screen within the field of vision of an individual a test object portions of which test object are shaped to afford dimensional and locational comparison with each other, which extend substantially over said field of vision, and which are rendered visible by light reflected from said screen polarized in two intersecting directions and which portions constitute test patterns for the respective eyes, placing polarizing means before each of the respective eyes with one of said polarizing means having its axis of polarization substantially parallel with one of said directions and with the other polarizing means having its axis of polarization substantially parallel with the other of said directions, comparing the actual pattern of said test object as formed by said portions, with its pattern as appearing to the individual, and determining a defect which may exist by discrepancy between said actual and said apparent pattern.

16. The method of testing defects of vision comprising presenting to an individual on a viewing screen within the field of vision of the individual a test device by projecting beams of polarized light towards said screen, portions of which test device are shaped to afford dimensional and locational comparison with each other, which are rendered visible by light reflected from said screen polarized in two intersecting directions, and which portions constitute test objects for the respective eyes, placing polarizing means before each of the respective eyes with one of said polarizing means having its axis of polarization substantially parallel with one of said directions and with the other polarizing means having its axis of polarization substantially parallel with the other of said directions, moving said test objects on said screen relatively to each other by moving at least part of said beams while each eye is monocularly viewing said objects rendered visible by polarized light, and by so moving, altering the relative position of said objects until they appear in a relation indicating a defect which may exist.

17. The method of testing vision comprising presenting to an individual on a viewing screen within the field of vision of the individual a test device by projecting beams of polarized light towards said screen, portions of which test device are shaped to afford judgment of dimensional relation with each other and which are rendered visible by light reflected from said screen polarized in two intersecting directions and which portions constitute test objects for the respective eyes, placing polarizing means before each of the respective eyes with one of said polarizing means having its axis of polarization substantially parallel with one of said directions and with the other polarizing means having its axis of polarization substantially parallel with the other of said directions, and altering said dimensional relation of said test objects by altering at least part of said beams while each eye is monocularly viewing said objects rendered visible by polarized light, until said relation indicates a defect which may exist.

18. Apparatus for testing vision of an individual comprising a test object, means rendering one section of said object visible by light effectively perceptible to both eyes of the individual, which section constitutes fixation means for the two eyes, means for rendering two portions of said test object visible by light perceptible to the respective eyes and which portions constitute test means for each respective eye, means positioned before the respective eyes for rendering each eye unresponsive to the light perceptible to the other eye, means for placing test lens means having controlled corrective characteristics before at least one of the eyes of the individual while both eyes are looking at said fixation means and said eye is viewing the respective portion of said test means, whereby said test lens means can be altered until a substantially normal state of vision exists for determining a defect which may exist by the extent of said altering.

19. Apparatus for testing binocular vision of an individual comprising means for presenting to the individual a test object two discrete portions of which have design thereon rendered visible by light polarized in two intersecting directions and which portions constitute test means for each respective eye, polarizing means placed before each of the respective eyes, one of said polarizing means having its axis of polarization substantially parallel with one of said directions and the other polarizing means having its axis of polarization substantially parallel with the other of said directions, means for placing test lens means having controlled corrective characteristics before at least one of the eyes of the individual while both eyes are viewing the respective portions of said test means, whereby said test lens means may be altered until a substantially normal state of vision exists, for determining a defect which may exist, by the extent of said altering.

20. Apparatus for testing vision of an individual comprising a test device having several portions with distinguishable characteristics, means for rendering one of said portions visible by effectively non-polarized light, said portion constituting a fixation object, means for rendering two other portions visible by light polarized in different directions and providing monocular test objects, light polarizing means before the respective eyes through which the test device may be viewed, one of said light polarizing means having its axis of polarization substantially parallel with one of said directions and the other of said light polarizing means having its axis of polarization substantially parallel with the other one of said directions whereby both eyes of the individual may see at said unpolarized fixation object and each eye may monocularly view the respective polarized monocular test objects, and corrective test lens means positioned before at least one of the eyes of the individual while both eyes are looking at the fixation object and are monocularly viewing respective ones of said monocular test objects, whereby a correction may be arrived at which will give best possible vision of the respective monocular test objects while maintaining best possible binocular vision.

21. Apparatus for testing vision of an individual comprising a test device having several portions with distinguishable characteristics, means for rendering one of said portions visible by effectively non-polarized light, said portion constituting a fixation object, and means for rendering another porion visible by polarized light in a certain direction and providing a monocular dioptric test object for one eye, and light polarizing means before the other eye having its axis of polarization substantially normal to said direction whereby both eyes of the individual may look at said fixation object and said first eye may monocularly view said polarized monocular test object, and corrective power test lens means positioned before said eye while both eyes are looking at the fixation object and said eye is monocularly viewing said monocular test object, whereby a dioptric correction may be arrived at which will give best possible vision of the respective monocular test object while maintaining best possible binocular vision.

22. Apparatus for testing vision of an individual comprising screen means in the field of vision of said individual, means for projecting on said screen means a test object having several portions with distinguishable characteristics, means for rendering two portions of said test object visible by light polarized in two intersecting directions and providing monocular test patterns, and light polarizing means before the respective eyes through which the test device may be viewed, one of said light polarizing means having its axis of polarization substantially parallel with one of said directions and the other of said light polarizing means having its axis of polarization substantially parallel with the other one of said directions whereby each eye of the individual may monocularly view the respective polarized pattern of the test object, and means for relatively moving said test patterns by adjusting the beams of said projecting means while both eyes are monocularly viewing the respective polarized patterns of the test object, whereby an apparent relation of said test patterns may be arrived at which is indicative of the best possible binocular vision.

23. Apparatus for testing vision of an individual comprising a test device having several portions with distinguishable characteristics, means for rendering one of said portions visible by effectively non-polarized light, said portion constituting a fixation object, and means for rendering another portion visible by polarized light in a certain direction and providing for one eye a series of correlated test characters arranged in groups with each group being varied as to respective sizes according to known standards established in the art of eye testing, and light polarizing means before the other eye having its axis of polarization substantially normal to said direction whereby both eyes of the individual may look at said fixation object and said first eye may monocularly view said series of test characters, and corrective power test lens means positioned before said eye while both eyes are looking at the fixation object and said eye is monocularly viewing said test characters, whereby a dioptric correction may be arrived at which will give best possible vision of the respective monocular test object while maintaining best possible binocular vision.

24. An eye testing apparatus for testing the deficiencies of the eyes of an individual separately under varying degrees of accommodation comprising a test device having adjacent sections, means to render one of said sections visible by non-polarized light on which the eyes may be single binocularly fixed and means having different distinguishable characteristics to render the other sections visible by light polarized in different directions controlled to be in substantially normal relation with each other and providing test images, and light polarizing means before the respective eyes and through which the test images are adapted to be viewed, one of said light polarizing means having its axis of polarization substantially parallel with the axis of polarization of one of the test images and the other of said light polarizing means having its axis of polarization substantially parallel with the axis of polarization of the other of said test images and substantially normally related with said first polarizing means whereby the eyes of the individual under test may be binocularly fixed on the unpolarized portion of the test device and may monocularly view the respective polarized sections of the test device and a plurality of test lenses of varying corrective characteristics adapted to be positioned before the respective eyes of the individual under test while the said eyes are binocularly fixed on the unpolarized portion of the test device and are monocularly viewing the respective polarized sections of said test device whereby a corrective power may be arrived at which will give best possible vision of the respective polarized sections of said test device.

25. Means for use in testing eyes monocularly with single binocular vision comprising a test device divided into adjacent sections, means to render one of said sections visible by non-polarized light and said section constituting eye fixation means visible to both eyes and on which said eyes may be singularly binocularly fixed, means to render another of said sections visible by light polarized in one direction and said section constituting test means for one eye and means to render another section visible by light polarized in a direction substantially normal to the direction of polarization of said first polarized section and said last section constituting eye fixation means for the other of said eyes, said sections being so correlated that the non-polarized section and the respective adjacent polarized sections will be simultaneously visible to the respective eyes, and light polarizing means before the respective eyes and through which the test device is adapted to be viewed, the light polarizing means before one eye having its axis positioned substantially parallel with the axis of polarization of one of the polarized sections of the test device and the axis of polarization of the polarizing means before the other eye having its axis of polarization positioned substantially parallel with the axis of polarization of the other of the polarized sections of the test device whereby the non-polarized section will be visible simultaneously to both eyes and will provide binocular fixation means for said eyes and the sections polarized in directions substantially normal to each other will be separately visible to the respective eyes.

26. In an eye testing device of the character described, a screen, means having an aperture for projecting an image bearing beam on said screen, a continuously adjustable prism in front of said aperture for deviating a portion of said beam and leaving it partly uncovered, means for polarizing in inclined planes the component beams emerging through said prism and the uncovered part of said aperture, respectively, and means for measurably adjusting said prism for the continuous relative adjustment of the directions of said component beams and therefore of their corresponding images on said screen.

27. A slide for use with the light projecting means of an eye testing device of the character described for projecting test patterns having different optical characteristics, said slide comprising a plate-like member having sections of different transparency forming pattern portions to be projected as an eye testing object, and material polarizing light in a single direction attached to said member and covering one part of said portions when in said light projection means, said part constituting a test pattern and another uncovered part forming a fixation pattern, and said slide being dimensioned for simultaneous projection of both parts.

28. A slide for use with the light projecting means of an eye testing device of the character described for projecting test patterns having different optical characteristics, said slide comprising a plate-like member having sections of different transparency forming pattern portions to be projected as an eye testing object, and polarizing material covering one part of said portions when in said light projection means, said part constituting a test pattern and another uncovered part forming a fixation pattern, and said slide being dimensioned for simultaneous projection of both parts.

29. A slide for use with the light projecting means of an eye testing device of the character described for projecting test patterns having different optical characteristics, said slide comprising a plate-like member having sections of different transparency forming pattern portions to be projected as an eye testing object, and polarizing material covering two parts of said portions, the axes of polarization in said respective portions being at substantially right angles when in said light projection means, said parts constituting two optically differentiated test patterns and said slide being dimensioned for simultaneous projection of both parts.

30. A slide for use with the light projecting means of an eye testing device of the character described for projecting test patterns having different optical characteristics, said slide comprising a plate-like member having sections of different transparency forming a fixation portion and a test portion of a visual acuity chart to be projected as a dioptric eye testing object, and material polarizing light in a single direction attached to said member and covering said test portion while leaving said fixation portion uncovered, said slide being dimensioned for simultaneous projection of both portions.

31. Device for testing vision while controlling the relative position of the patient's head, of his eyes and of a test object, comprising two projection screens, a scale on one of said screens, a projector producing an indicator light beam, means for fastening said projector on the patient's head, means for projecting a test object pattern on the second one of said screens, and supporting means, said screens being mounted on said supporting means at an angle to each other, and said projecting means being mounted on said supporting means for projecting said test pattern on said second screen, for reception of said beam on said first screen and for observation of said second screen by the patient placed in said angle and carrying said projector.

32. A device for spatially correlating the head of a patient and a test object, comprising test target means mounted for observation by a person, a light projector producing an indicator beam, means for fastening said projector to the head of the person, and scale means fixed relatively to said target means to receive a light beam from said projector fastened to the head of the person observing said target means, said scale and said beam indicating the relative position of head and test target means.

ADELBERT AMES, Jr.
HENRY A. IMUS.